United States Patent
Oba et al.

(10) Patent No.: US 9,958,727 B2
(45) Date of Patent: May 1, 2018

(54) WAVELENGTH CONVERSION MEMBER, BACKLIGHT UNIT INCLUDING WAVELENGTH CONVERSION MEMBER, LIQUID CRYSTAL DISPLAY DEVICE, AND METHOD OF MANUFACTURING WAVELENGTH CONVERSION MEMBER

(71) Applicant: FUJIFILM Corporation, Tokyo (JP)

(72) Inventors: Tatsuya Oba, Kanagawa (JP); Tomonari Ogawa, Kanagawa (JP); Keisuke Oku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/593,914

(22) Filed: May 12, 2017

(65) Prior Publication Data

US 2017/0248809 A1    Aug. 31, 2017

Related U.S. Application Data

(63) Continuation of application No. PCT/JP2015/005637, filed on Nov. 11, 2015.

(30) Foreign Application Priority Data

Nov. 14, 2014 (JP) ................. 2014-232119

(51) Int. Cl.
*G02F 1/13357* (2006.01)
*G02F 1/1335* (2006.01)
*F21V 8/00* (2006.01)

(52) U.S. Cl.
CPC .......... *G02F 1/1336* (2013.01); *G02B 6/005* (2013.01); *G02F 2001/133614* (2013.01); *G02F 2202/36* (2013.01)

(58) Field of Classification Search
CPC ....... G02F 1/1336; G02F 2001/133614; G02F 2202/36; G02B 6/005
(Continued)

(56) References Cited

U.S. PATENT DOCUMENTS

2012/0113672 A1    5/2012 Dubrow et al.
2015/0204515 A1*   7/2015 Xu ................. B82Y 20/00
                                              362/84

(Continued)

FOREIGN PATENT DOCUMENTS

JP    2014523634 A    9/2014
WO    2012/164284 A1  12/2012

OTHER PUBLICATIONS

International Search Report issued in connection with International Patent Application No. PCT/JP2015/005637 dated Mar. 22, 2016.
(Continued)

*Primary Examiner* — John A McPherson
(74) *Attorney, Agent, or Firm* — Edwards Neils LLC; Jean C. Edwards, Esq.

(57) ABSTRACT

The wavelength conversion member includes: a first substrate; a second substrate; and a wavelength conversion layer disposed between the first substrate and the second substrate and including quantum dots which are excited by excitation light to emit fluorescence. The wavelength conversion layer is a cured layer obtained by curing a polymerizable composition which includes the quantum dots and a polymerizable compound having a molecular weight of 200 or lower, and the number of bubble-shaped defects having a diameter of 0.1 mm or more in the wavelength conversion layer is less than 10 per 100 $cm^2$.

19 Claims, 8 Drawing Sheets

(58) Field of Classification Search
USPC .......................................................... 349/71
See application file for complete search history.

(56) References Cited

U.S. PATENT DOCUMENTS

2016/0164031 A1* 6/2016 Pieper ...................... C08J 7/045
                                                          257/13
2016/0230961 A1* 8/2016 Seo .......................... G02B 1/14
2016/0340553 A1* 11/2016 Eckert ..................... B32B 27/08
2017/0158925 A1* 6/2017 Pieper .................... C09J 163/00

OTHER PUBLICATIONS

Written Opinion issued in connection with International Patent Application No. PCT/JP2015/005637 dated Mar. 22, 2016.

* cited by examiner

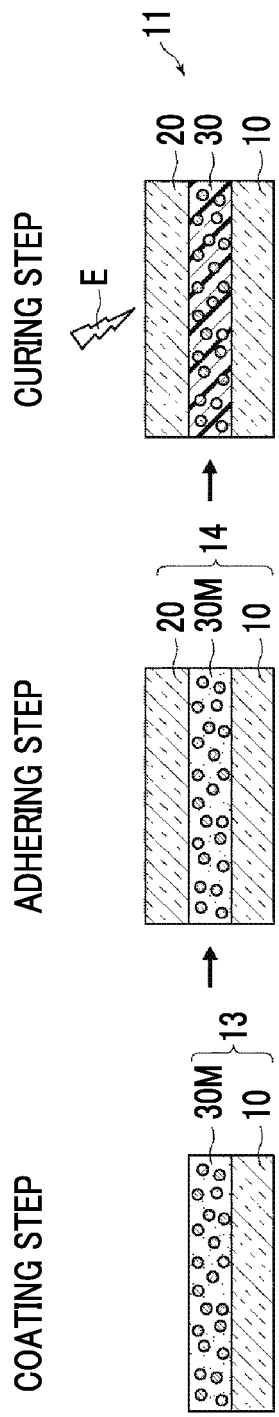

WAVELENGTH CONVERSION MEMBER, BACKLIGHT UNIT INCLUDING WAVELENGTH CONVERSION MEMBER, LIQUID CRYSTAL DISPLAY DEVICE, AND METHOD OF MANUFACTURING WAVELENGTH CONVERSION MEMBER

CROSS-REFERENCE TO RELATED APPLICATIONS

This application is a Continuation of PCT International Application No. PCT/JP2015/005637 filed on Nov. 11, 2015, which was published under PCT Article 21(2) in Japanese, and which claims priority under 35 U.S.C. § 119(a) to Japanese Patent Application No. 2014-232119 filed on Nov. 14, 2014. The above applications are hereby expressly incorporated by reference, in their entirety, into the present application.

BACKGROUND OF THE INVENTION

1. Field of the Invention

The present invention relates to a wavelength conversion member, a backlight unit including the wavelength conversion member, a liquid crystal display device, and a method of manufacturing a wavelength conversion member, the wavelength conversion member including a wavelength conversion layer including quantum dots which emit fluorescence when irradiated with excitation light.

2. Description of the Related Art

A flat panel display such as a liquid crystal display device (hereinafter, also referred to as "LCD") has been more widely used as a space-saving image display device having low power consumption. A liquid crystal display device includes at least a backlight and a liquid crystal cell and typically further includes a member such as a backlight-side polarizing plate or a visible-side polarizing plate.

Recently, a configuration in which a wavelength conversion layer including quantum dots (QDs) as a light emitting material is provided in a wavelength conversion member of a backlight unit in order to improve color reproducibility of a LCD has attracted attention (refer to US2012/0113672A). The wavelength conversion member converts the wavelength of light incident from a light source so as to emit white light. In the wavelength conversion layer including the quantum dots as a light emitting material, white light can be realized using fluorescence which is emitted by excitation of two or three kinds of quantum dots having different light emitting properties caused by light incident from a light source.

The fluorescence emitted from the quantum dots has high brightness and a small full width at half maximum. Therefore, a LCD using quantum dots has excellent color reproducibility. Due to the progress of such a three-wavelength light source technique using quantum dots, the color reproduction range has been widened from 72% to 100% in terms of National Television System Committee (NTSC) ratio.

Quantum dots have a problem in that the emission intensity decreases due to a photooxidation reaction when coming into contact with oxygen. Regarding this point, JP2014-523634A reports a wavelength conversion member in which quantum dots are embedded in an acrylic resin having excellent heat resistance and oxygen barrier properties in order to protect the quantum dots from oxygen and the like.

SUMMARY OF THE INVENTION

Recently, further improvement of oxygen barrier properties has been required for a layer including quantum dots.

According to a thorough investigation by the present inventors, it was found that oxygen barrier properties can be improved by using a polymerizable compound having a molecular weight of 200 or lower as an organic matrix. On the other hand, it was also found that, in a case where a wavelength conversion layer is formed using a polymerizable compound having a molecular weight of 200 or lower, there is a problem in that bubbles are formed in the formed wavelength conversion layer, which may lead to peeling from a substrate supporting the wavelength conversion layer or to deterioration in oxygen barrier properties due to the presence of the bubbles.

Therefore, a wavelength conversion member in which bubbles are not formed while improving oxygen barrier properties is required.

The present invention has been made in consideration of the above-described circumstances, and an object thereof is to provide: a wavelength conversion member in which oxygen barrier properties are excellent and the formation of bubbles is suppressed; and a method of manufacturing the wavelength conversion member.

In addition, another object of the present invention is to provide a backlight unit including a wavelength conversion member having excellent oxygen barrier properties, and a liquid crystal display device.

According to the present invention, there is provided a wavelength conversion member comprising:

a first substrate;

a second substrate; and a wavelength conversion layer disposed between the first substrate and the second substrate and including quantum dots which are excited by excitation light to emit fluorescence, in which the wavelength conversion layer is a cured layer obtained by curing a polymerizable composition which includes the quantum dots and a polymerizable compound having a molecular weight of 200 or lower, and the number of bubble-shaped defects having a diameter of 0.1 mm or more is less than 10 per 100 $cm^2$.

In the present invention, it is preferable that the polymerizable compound is a radically polymerizable compound.

In addition, it is preferable that the polymerizable compound includes at least one monofunctional compound.

In the present invention, it is preferable that a content of the monofunctional compound in the polymerizable compound is 50 mass % or higher with respect to the total weight of the polymerizable compound.

It is preferable that an oxygen permeability co-efficient of the wavelength conversion layer is 100 [$cm^3 \cdot mm/(m^2 \cdot day \cdot atm)$] or lower.

It is more preferable that both the first substrate and the second substrate are barrier films having an oxygen permeability of 5.00 [$cm^3/(m^2 \cdot day \cdot atm)$] or lower.

It is preferable that the quantum dots are at least one kind of quantum dots selected from the group consisting of quantum dots having a center emission wavelength in a wavelength range of 600 nm to 680 nm and having a full width at half maximum of emission peak of 70 nm or less, quantum dots having a center emission wavelength in a wavelength range of 520 nm to 560 nm and having a full width at half maximum of emission peak of 60 nm or less, and quantum dots having a center emission wavelength in a wavelength range of 430 nm to 480 nm and having a full width at half maximum of emission peak of 50 nm or less.

According to the present invention, there is provided a backlight unit comprising:

the above-described wavelength conversion member; and a light source that emits the excitation light and includes a blue light emitting diode or an ultraviolet light emitting diode.

According to the present invention, there is provided a liquid crystal display device comprising at least the above-described backlight unit and a liquid crystal cell.

According to the present invention, there is provided a method of manufacturing a first wavelength conversion member, the wavelength conversion member including a first substrate, a second substrate, and a wavelength conversion layer disposed between the first substrate and the second substrate and including quantum dots which are excited by excitation light to emit fluorescence.

The method comprises:

preparing a polymerizable composition which includes the quantum dots and a polymerizable compound having a boiling point of 190° C. or lower and a molecular weight of 200 or lower;

forming a coating film by applying the polymerizable composition including the quantum dots to a single surface of the first substrate;

forming the wavelength conversion layer by irradiating the coating film with active energy rays to cure the coating film while maintaining a film surface temperature T of the coating film in a temperature range defined by 25° C.<T< (the boiling point of the polymerizable composition-5)° C.; and laminating the second substrate on the wavelength conversion layer.

It is preferable that, in the step of curing the coating film, a non-coating film surface of the first substrate is supported in contact with a backup roll, and the film surface temperature of the coating film is adjusted by adjusting a temperature of the backup roll and an irradiation dose of the active energy rays.

An irradiating portion that irradiates the coating film with energy rays may be surrounded by a casing. In addition, the temperature of an irradiating portion atmosphere in the casing may be controlled using heating and cooling means such that the film surface temperature can be adjusted not only by adjusting the temperature of the backup roll and the irradiation dose of the active energy rays but also by controlling the temperature of the irradiating portion atmosphere.

It is preferable that the step of curing the coating film is performed in an inert gas having an oxygen concentration of 1% or lower.

It is preferable that the coating film is cured by using ultraviolet light as the active energy rays while controlling a rising slope of illuminance, which is defined by a peak illuminance during irradiation of the ultraviolet light/(an irradiation time×½), to be 500 mW/(cm²·s) or lower.

It is preferable that a plurality of irradiation light sources that emit the active energy rays to irradiate the coating film with the active energy rays are provided, a reaction rate of the polymerizable compound included in the coating film, which is obtained by irradiation of the active energy rays emitted from a first irradiation light source, is set to be 10% to 80% with respect to a final reaction rate of the polymerizable compound, and then the coating film is irradiated with the active energy rays emitted from second and other irradiation light sources.

According to the present invention, there is provided a method of manufacturing a second wavelength conversion member, the wavelength conversion member including a first substrate, a second substrate, and a wavelength conversion layer disposed between the first substrate and the second substrate and including quantum dots which are excited by excitation light to emit fluorescence.

The method comprises:

preparing a polymerizable composition which includes the quantum dots and a polymerizable compound having a boiling point of 190° C. or lower and a molecular weight of 200 or lower;

forming a coating film by applying the polymerizable composition including the quantum dots to a single surface of the first substrate;

laminating the second substrate on the coating film such that the coating film is interposed between the first substrate and the second substrate; and forming the wavelength conversion layer by irradiating the coating film with active energy rays to cure the coating film while maintaining a film surface temperature T of the coating film in a temperature range defined by 25° C.<T< (the boiling point of the polymerizable composition+15)° C.

It is preferable that, in the step of curing the coating film, a non-coating film surface of the first substrate is supported in contact with a backup roll, and the film surface temperature of the coating film is adjusted by adjusting a temperature of the backup roll and an irradiation dose of the active energy rays.

An irradiating portion that irradiates the coating film with energy rays may be surrounded by a casing. In addition, the temperature of an irradiating portion atmosphere in the casing may be controlled using heating and cooling means such that the film surface temperature can be adjusted not only by adjusting the temperature of the backup roll and the irradiation dose of the active energy rays but also by controlling the temperature of the irradiating portion atmosphere.

It is preferable that the step of curing the coating film is performed in an inert gas having an oxygen concentration of 1% or lower.

It is preferable that the coating film is cured by using ultraviolet light as the active energy rays while controlling a rising slope of illuminance, which is defined by a peak illuminance during irradiation of the ultraviolet light/(an irradiation time×½), to be 500 mW/(cm²·s) or lower.

It is preferable that a plurality of irradiation light sources in which an active energy ray irradiating device emits the active energy rays to irradiate the coating film with the active energy rays are provided, a reaction rate of the polymerizable compound included in the coating film, which is obtained by irradiation of the active energy rays emitted from a first irradiation light source, is set to be 10% to 80% with respect to a final reaction rate of the polymerizable compound, and then the coating film is irradiated with the active energy rays emitted from second and other irradiation light sources.

According to the present invention, there is provided a wavelength conversion member comprising: a first substrate; a second substrate; and a wavelength conversion layer disposed between the first substrate and the second substrate and including quantum dots which are excited by excitation light to emit fluorescence, in which the wavelength conversion layer is a cured layer obtained by curing a polymerizable composition which includes the quantum dots and a polymerizable compound having a molecular weight of 200 or lower, and the number of bubble-shaped defects having a diameter of 0.1 mm or more is less than 10 per 100 cm².

According to this configuration, oxygen barrier properties are excellent, and the formation of bubbles is suppressed. Therefore, a wavelength conversion member in which peeling and deterioration in oxygen barrier properties are not likely to occur can be provided.

BRIEF DESCRIPTION OF THE DRAWINGS

FIG. 7 is a schematic diagram showing steps of manufacturing the wavelength conversion member shown in FIG. 2.

DESCRIPTION OF THE PREFERRED EMBODIMENTS

Figure 1:
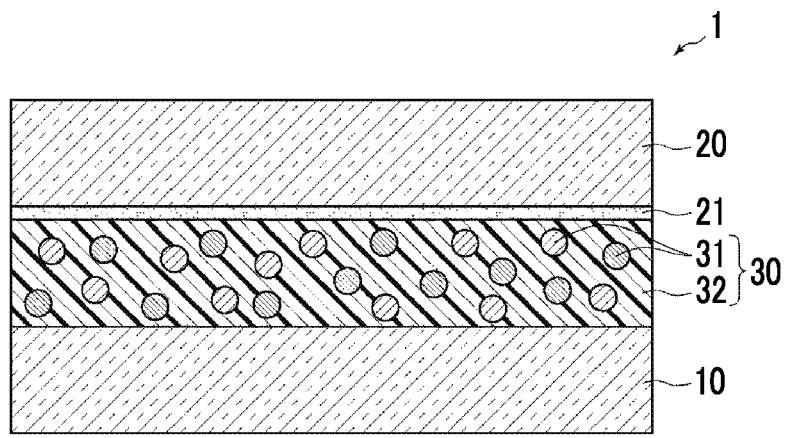
FIG. 1 is a cross-sectional view showing a wavelength conversion member according to a first embodiment of the present invention.

Hereinafter, embodiments of the present invention will be described with reference to the drawings. In the drawings of this specification, dimensions of respective portions are appropriately changed in order to easily recognize the respective portions. In this specification, numerical ranges represented by "to" include numerical values before and after "to" as lower limit values and upper limit values.

[Wavelength Conversion Member]

FIG. 1 is a cross-sectional view showing a wavelength conversion member 1 according to a first embodiment of the present invention.

The wavelength conversion member 1 according to the embodiment includes: a first substrate 10; a second substrate 20; and a wavelength conversion layer 30 disposed between the first substrate 10 and the second substrate 20 and including quantum dots 31 which are excited by excitation light to emit fluorescence. In addition, an adhesive layer 21 is provided between the second substrate 20 and the wavelength conversion layer 30.

The wavelength conversion layer 30 is a cured layer obtained by irradiating a coating film formed of a polymerizable composition, which includes the quantum dots 31 and a polymerizable compound having a molecular weight of 200 or lower, with active energy rays to cure the coating film. In the wavelength conversion layer 30, the quantum dots 31 are dispersed in an organic matrix 32 obtained by polymerization of the polymerizable compound. In the cured layer, that is, the wavelength conversion layer 30, the number of bubble-shaped defects having a diameter of 0.1 mm or more is less than 10 per 100 $cm^2$.

It is preferable that an oxygen permeability co-efficient of the wavelength conversion layer 30 is 100 $[cm^3 \cdot mm/(m^2 \cdot day \cdot atm)]$ or lower.

It is preferable that the first substrate 10 and the second substrate 20 have oxygen barrier properties, and it is more preferable that both the first substrate and the second substrate are barrier films having an oxygen permeability of 5.00 $[cm^3/(m^2 \cdot day \cdot atm)]$ or lower. The details of the substrates will be described below.

The content of components having a molecular weight of 400 or lower in the wavelength conversion layer 30 is 1% or lower with respect to the total weight of the wavelength conversion layer 30. In particular, in steps of manufacturing the wavelength conversion layer described below, by adjusting the content of components having a molecular weight of 400 or lower to be 1% or lower with respect to the total weight of the wavelength conversion layer 30 immediately after the formed coating film is cured (immediately after the coating film passes through a curing portion), a wavelength conversion layer in which the number of bubble-shaped defects having a diameter of 0.1 mm or more is less than 10 per 100 $cm^2$ can be obtained. It is considered that bubbles are formed due to the remaining of components having a molecular weight of 400 or lower after the curing. In addition, It is also considered that the formation of bubbles in the wavelength conversion layer can be reduced by reducing the components having a molecular weight of 400 or lower.

A method of measuring the content of the components having a molecular weight of 400 or lower in the wavelength conversion layer 30 will be described.

The components having a molecular weight of 400 or lower may include not only a monomer but also a dimer.

(Measurement of Weight of Residual Components)

The weight of residual components can be obtained by measuring a weight change using, for example, TG-DTA 2000S (manufactured by Mac Science Co., Ltd.) when a sample is heated to an arbitrary temperature and held at the temperature. At this time, it is considered that volatile components volatilized during the temperature increase correspond to the residual components.

(Measurement of Molecular Weight Distribution of Residual Components)

A molecular weight distribution of the residual components can be measured using, for example, a gas chromatography-mass spectrometer GCMS (manufactured by Shimadzu Corporation) after heating a sample to an appropriately temperature to discharge the residual components.

By using "Measurement of Weight of Residual Components" and "Measurement of Molecular Weight Distribution of Residual Components" in combination, the content of compounds having a molecular weight of 400 or lower remaining in a sample can be measured. The specific procedure can be found in the description of [Examples] below.

Figure 2:
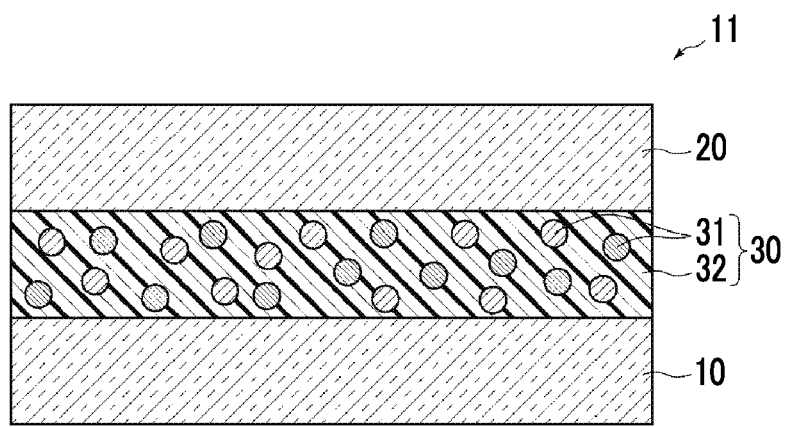
FIG. 2 is a cross-sectional view showing a wavelength conversion member according to a second embodiment of the present invention.

FIG. 2 is a cross-sectional view showing a wavelength conversion member 11 according to a second embodiment of the present invention.

The wavelength conversion member 11 according to the second embodiment is different from the wavelength conversion member 1 according to the first embodiment shown in FIG. 1, in that the adhesive layer 21 is not provided between the second substrate 20 and the wavelength conversion layer 30. The other configurations are the same as those of the wavelength conversion member 1 according to the first embodiment.

In the wavelength conversion member 11, similarly, the wavelength conversion layer 30 is also a cured layer obtained by irradiating a coating film formed of a polymerizable composition, which includes the quantum dots 31 and a polymerizable compound having a molecular weight of 200 or lower, with active energy rays to cure the coating film. In the wavelength conversion layer 30, the quantum dots 31 are dispersed in the organic matrix 32. In the cured layer, that is, the wavelength conversion layer 30, the number of bubble-shaped defects having a diameter of 0.1 mm or more is less than 10 per 100 cm$^2$.

Hereinafter, respective layers constituting the wavelength conversion member 1 or 11 will be described below in detail.

—Wavelength Conversion Layer—

As described above, the wavelength conversion layer 30 is a cured layer which is formed by irradiating the polymerizable composition with active energy rays. In the wavelength conversion layer 30, the quantum dots 31 that emit fluorescence when irradiated with excitation light are dispersed in the organic matrix 32. The shape of the wavelength conversion layer 30 is not particularly limited and may be an arbitrary shape. In FIG. 1, the quantum dots 31 are enlarged and shown in order to easily recognize the quantum dots. Actually, for example, the thickness of the wavelength conversion layer 30 is 30 to 100 μm, and the diameter of the quantum dot 31 is about 2 to 10 nm.

The thickness of the wavelength conversion layer 30 is preferably in a range of 1 to 500 μm, more preferably in a range of 10 to 250 μm, and still more preferably in a range of 20 to 150 μm. It is preferable that the thickness is 1 μm or more because a high wavelength conversion effect can be obtained. In addition, it is preferable that the thickness is 500 μm or less because, in a case where the wavelength conversion member is incorporated into a backlight unit, the thickness of the backlight unit can be reduced.

(Quantum Dots)

The quantum dots 31 are excited by incident excitation light to emit fluorescence. Well-known kinds of quantum dots include quantum dots (A) having a center emission wavelength in a wavelength range of 600 nm to 680 nm, quantum dots (B) having a center emission wavelength in a wavelength range of 500 nm to 600 nm, and quantum dots (C) having a center emission wavelength in a wavelength range of 400 nm to 500 nm. The quantum dots (A) are excited by the excitation light to emit red light, the quantum dots (B) are excited by the excitation light to emit green light, and the quantum dots (C) are excited by the excitation light to emit blue light.

In particular, the full width at half maximum of emission peak of the quantum dots (A), (B), and (C) is preferably 70 nm or less, more preferably 60 nm or less, and still more preferably 50 nm or less.

For example, in a case where blue light is incident as excitation light on the wavelength conversion member including the quantum dots (A) and the quantum dots (B), white light can be realized by red light emitted from the quantum dots (A), green light emitted from the quantum dots (B), and blue light having passed through the wavelength conversion member. In addition, in a case where ultraviolet light is incident as excitation light on the wavelength conversion member including the quantum dots (A), (B), and (C), white light can be realized by red light emitted from the quantum dots (A), green light emitted from the quantum dots (B), and blue light emitted from the quantum dots (C).

The details of the quantum dots can be found in, for example, paragraphs "0060" to "0066" of JP2012-169271A, but the present invention is not limited thereto. As the quantum dots, a commercially available product can be used without any particular limitation.

The quantum dots may be added to the polymerizable composition in the form of particles or in the form of a dispersion in which they are dispersed in a solvent. It is preferable that the quantum dots are added in the form of a dispersion from the viewpoint of suppressing aggregation of particles of the quantum dots. The solvent used herein is not particularly limited. However, it is preferable that the polymerizable composition does not substantially include a volatile organic solvent. Therefore, in a case where the quantum dots are added to the polymerizable composition in the form of a dispersion where they are dispersed in a solvent, it is preferable that a step of drying the solvent in the polymerizable composition is performed before applying the polymerizable composition to the first substrate to form a coating film thereon. From the viewpoint of eliminating the step of drying the solvent, it is preferable that the quantum dots are added to the polymerizable composition in the form of particles.

The volatile organic solvent refers to a compound which has a boiling point of 160° C. or lower and is liquid at 20° C. such that it is not cured by the polymerizable compound and an external stimulus. The boiling point of the volatile organic solvent is preferably 160° C. or lower, more preferably 115° C. or lower, and most preferably 30° C. to 100° C.

In a case where the polymerizable composition does not substantially include the volatile organic solvent, the proportion of the volatile organic solvent in the polymerizable composition is preferably 10000 ppm or lower and more preferably 1000 ppm or lower.

For example, 0.01 parts by mass to 10 parts by mass of the quantum dots can be added to the polymerizable composition with respect to 100 parts by mass of the total mass of the polymerizable composition.

(Polymerizable Compound)

The polymerizable composition includes, as the polymerizable compound, at least a monomer which is a compound having a boiling point of 190° C. or lower and a molecular weight of 200 or lower. The polymerizable composition may include a compound having a molecular weight of higher than 200 as the polymerizable compound.

It is preferable that the polymerizable composition includes 30 mass % or higher of the monomer having a molecular weight of 200 or lower as the polymerizable compound from the viewpoint of improving oxygen barrier properties.

It is preferable that the polymerizable composition includes 20 mass % or lower of the polymerizable compound having a molecular weight of higher than 200

The polymerizable composition may include an active energy ray-curable polymerizable compound as the polymerizable compound. The active energy ray-curable polymerizable compound refers to a compound which forms a resin through a crosslinking reaction and a polymerization reaction by being irradiated with active energy rays. The active energy rays refer to electromagnetic waves such as ultraviolet light, electron rays, radiations (for example, α rays, β rays, or γ rays). As the active energy ray-curable polymerizable compound, for example, a compound including a functional group of a polyfunctional monomer or a polyfunctional oligomer which is curable by light (ultraviolet light), electron rays, or radiations can be used. It is preferable that the polymerizable composition includes at least one radically polymerizable compound. As the functional group included in the polymerizable compound, a photopolymerizable functional group is preferable. Examples of the photopolymerizable functional group include an unsaturated polymerizable functional group such as a (meth)acryloyl group, a vinyl group, styryl group, or an allyl group.

In addition, it is preferable that the polymerizable compound includes at least one monofunctional compound.

—(Meth)Acrylate—

From the viewpoint of transparency and adhesiveness of the cured coating film, a (meth)acrylate compound such as a monofunctional or polyfunctional (meth)acrylate monomer or a polymer or prepolymer thereof is preferable. In the present invention and this specification, "(meth)acrylate" represents "either or both of acrylate and methacrylate". The same shall be applied to "(meth)acryloyl".

—Monofunctional (Meth)Acrylate Monomer—

As the monofunctional (meth)acrylate monomer, for example, acrylic acid, methacrylic acid, or a derivative thereof can be used. More specifically, a monomer having a polymerizable unsaturated bond ((meth)acryloyl group) of (meth)acrylic acid in the molecule can be used. Hereinafter, specific examples of the monofunctional (meth)acrylate monomer include the following compounds, but the present invention is not limited thereto.

Specific examples include: methyl an alkyl (meth)acrylate with an alkyl group having 1 to 20 carbon atoms such as methyl (meth)acrylate, n-butyl (meth)acrylate, isobutyl (meth)acrylate, 2-ethylhexyl (meth)acrylate, or isononyl (meth)acrylate; a (meth)acrylate having an alicyclic structure and having 4 to 20 carbon atoms in total such as cyclohexyl (meth)acrylate, dicyclopentanyl (meth)acrylate, isobornyl (meth)acrylate, or a methylene oxide adduct of cyclodecatriene (meth)acrylate; a (meth)acrylate having a hydroxyl group such as 2-hydroxyethyl (meth)acrylate, 3-hydroxypropyl (meth)acrylate, 4-hydroxybutyl (meth)acrylate, triethylene glycol mono(meth)acrylate, tetraethylene glycol mono(meth)acrylate, hexaethylene glycol mono(meth)acrylate, octapropylene glycol mono(meth)acrylate, or glycerol mono(meth)acrylate or di(meth)acrylate; and a (meth)acrylate having a glycidyl group such as glycidyl (meth)acrylate.

From the viewpoint of adjusting the viscosity of the polymerizable composition to be in a preferable range and suppressing curing shrinkage, the amount of the monofunctional (meth)acrylate monomer used is preferably 30 parts by mass or more and more preferably 50 to 99 parts by mass with respect to 100 parts by mass of the total mass of the polymerizable compound included in the polymerizable composition.

—Bifunctional (Meth)Acrylate Monomer—

As a polymerizable monomer having two polymerizable groups, for example, a bifunctional polymerizable unsaturated monomer having two ethylenically unsaturated bond-containing groups can be used. The bifunctional polymerizable unsaturated monomer is preferable from the viewpoint of imparting mechanical strength. In the present invention, a (meth)acrylate compound having excellent reactivity and having no problem of a residual catalyst or the like is preferable.

In particular, for example, neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, or dicyclopentanyl di(meth)acrylate is preferably used in the present invention. Among these compounds, one kind can be used alone, and a mixture of two or more kinds can be used.

—Trifunctional or Higher (Meth)Acrylate Monomer—

As a polymerizable monomer having three or more polymerizable groups, for example, a polyfunctional polymerizable unsaturated monomer having three or more ethylenically unsaturated bond-containing groups can be used. The polyfunctional polymerizable unsaturated monomer is preferable from the viewpoint of imparting mechanical strength. In the present invention, a (meth)acrylate compound having excellent reactivity and having no problem of a residual catalyst or the like is preferable.

Specifically, ECH-modified glycerol tri(meth)acrylate; EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxy enta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, or pentaerythritol tetra(meth)acrylateis preferable. Among these compounds, one kind can be used alone, and a mixture of two or more kinds can be used.

—Epoxy Compound and Others—

Examples of the polymerizable monomer used in the present invention include a compound having a cyclic group such as a ring-opening polymerizable cyclic ether group (for example, an epoxy group or an oxetanyl group). As this compound, for example, a compound (epoxy compound) having an epoxy group can be used. By using the compound having an epoxy group or an oxetanyl group in combination with the (meth)acrylate compound, adhesiveness with the substrate is likely to be improved.

Examples of the compound having an epoxy group include polyglycidyl esters of polybasic acids, polyglycidyl ethers of polyols, polyglycidyl ethers of polyoxyalkylene glycols, polyglycidyl ethers of aromatic polyols, hydrogenated polyglycidyl ethers of aromatic polyols, urethane-polyepoxy compounds, and epoxidized polybutadienes. Among these compounds, one kind can be used alone, and a mixture of two or more kinds can be used.

Other examples of the compound having an epoxy group which can be preferably used include: an aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, and polypropylene glycol diglycidyl ether; polyglycidyl ethers of polyether polyols obtained by adding one alkylene oxide or two or more alkylene oxides to an aliphatic polyol such as ethylene glycol, propylene glycol, or glycerin; diglycidyl esters of aliphatic long-chain dibasic acids; monoglycidyl ethers of aliphatic higher alcohols; monoglycidyl ethers of phenol, cresol, butyl phenol, or polyether alcohols obtained by adding an alkylene oxide to phenol, cresol, or butyl phenol; and glycidyl esters of higher fatty acids.

Among these components, an aliphatic cyclic epoxy compound, bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerin triglycidyl ether, trimethylolpropane triglycidyl ether, neopentyl glycol diglycidyl ether, polyethylene glycol diglycidyl ether, or polypropylene glycol diglycidyl ether is preferable.

Examples of a commercially available product which is preferably used as the compound having an epoxy group or an oxetanyl group include: UVR-6216 (manufactured by Union Carbide Corporation); GLYCIDOL, AOEX 24, CYCLOMER A200, CELLOXIDE 2021P, and CELLOXIDE 8000, (all of which are manufactured by Daicel Corporation); 4-vinylcyclohexene dioxide (manufactured by Sigma-Aldrich Co. LLC.), EPIKOTE 828, EPIKOTE 812, EPIKOTE 1031, EPIKOTE 872, and EPIKOTE CT 508 (all of which are manufactured by Japan Epoxy Resins Co., Ltd.); and KRM-2400, KRM-2410, KRM-2408, KRM-2490, KRM-2720, and KRM-2750 (all of which are manufactured by Adeka Corporation). Among these, one kind can be used alone, or two or more kinds can be used in combination.

As the polymerizable compound used in the present invention, a vinyl ether compound may be used.

As the vinyl ether compound, a well-known vinyl ether compound can be appropriately selected. For example, a vinyl ether compound described in paragraph "0057" of JP2009-73078A can be preferably adopted.

The vinyl ether compound can be synthesized using, for example, a method described in "Stephen, C. Lapin, Polymers Paint Colour Journal 179 (4237), 321 (1988)", that is, through a reaction between a polyol or a polyphenol and acetylene or a reaction between a polyol or a polyphenol and halogenated alkyl vinyl ether. Among these, one kind can be used alone, or two or more kinds can be used in combination.

From the viewpoints of reducing the viscosity and increasing the hardness, as the polymerizable composition according to the present invention, a silsesquioxane compound having a reactive group described in JP2009-73078A can be used.

(Thixotropic Agent)

It is preferable that a thixotropic agent is added to the polymerizable composition. The thixotropic agent is an inorganic compound or an organic compound.

As the inorganic thixotropic agent, inorganic particles having an aspect ratio of 1.2 to 300 are preferable, inorganic particles having an aspect ratio of 2 to 200 are more preferable, inorganic particles having an aspect ratio of 5 to 200 are still more preferable, inorganic particles having an aspect ratio of 5 to 100 are still more preferable, and inorganic particles having an aspect ratio of 5 to 50 are still more preferable. In the above-described range, the present state of the quantum dots which can be used in combination can be controlled, and unnecessary internal scattering caused by the inorganic thixotropic agent can be reduced, which is effective for improving contrast.

The major axis length of the inorganic thixotropic agent is preferably 5 nm to 1 μm and more preferably 5 nm to 300 nm.

Any inorganic thixotropic agent which satisfy the above-described aspect ratio can be used without any particular limitation. For example, a needle-shaped compound, a chain compound, a flat compound, or a layer compound can be preferably used. Among these, a layer compound is more preferable.

The layer compound is not particularly limited, and examples thereof include talc, mica, feldspar, kaolinite (kaolin clay), pyrophyllite (pyrophyllite clay), sericite, bentonite, smectite and vermiculite (for example, montmorillonite, beidellite, nontronite, or saponite), organic bentonite, and organic smectite.

In addition, as the inorganic thixotropic agent, for example, silica, alumina, silicon nitride, titanium dioxide, calcium carbonate, or zinc oxide can be used irrespective of the aspect ratio thereof. Optionally, this compound may be surface-treated to be hydrophilic or hydrophobic.

Examples of the organic thixotropic agent include oxidized polyolefin and modified urea.

The content of the thixotropic agent in the polymerizable composition is preferably 0.120 parts by mass, more preferably 0.2 to 10 parts by mass, and still more preferably 0.2 to 8 parts by mass with respect to 100 parts by mass of the curable compound. In particular, regarding the inorganic thixotropic agent, in a case where the content is 20 parts by mass or less with respect to 100 parts by mass of the curable compound, brittleness can be improved.

(Polymerization Initiator)

The polymerizable composition used in the present invention can include a well-known photopolymerization initiator as a polymerization initiator. The details of the polymerization initiator can be found in paragraph "0037" of JP2013-043382A. The content of the polymerization initiator is preferably 0.1 mol % or higher and more preferably 0.5 mol % to 2 mol % with respect to the total amount of the polymerizable compound included in the polymerizable composition. In addition, the content of the polymerization initiator is preferably 0.1 mass % to 10 mass % and more preferably 0.2 mass % to 8 mass % with respect to the total amount of the polymerizable composition excluding the volatile organic solvent.

(Silane Coupling Agent)

The wavelength conversion layer which is formed of the polymerizable composition including a silane coupling agent has strong adhesiveness with an adjacent layer due to the silane coupling agent and thus exhibits excellent weather fastness. The main reason for this is that the silane coupling agent included in the wavelength conversion layer forms a covalent bond between a surface of the adjacent layer and a constituent element of the wavelength conversion layer through a hydrolysis reaction or a condensation reaction. In addition, in a case where the silane coupling agent includes a reactive functional group such as a radically polymerizable group, the formation of a crosslinking structure with a monomer component constituting the wavelength conversion layer can also contribute to improvement of adhesiveness between the wavelength conversion layer and the adjacent layer.

As the silane coupling agent, a well-known silane coupling agent can be used without any particular limitation.

Examples of the silane coupling agent which is preferable from the viewpoint of adhesiveness include a silane coupling agent represented by the following Formula (1) described in JP2013-43382A.

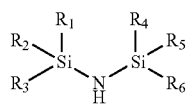

Formula (1)

Formula (1)
(In Formula (1), $R_1$ to $R_6$ each independently represent a substituted or unsubstituted alkyl group or aryl group, in which at least one of $R_1$, $R_2$, $R_3$, $R_4$, $R_5$, or $R_6$ represents a substituent having a radically polymerizable carbon-carbon double bond.)

—First Substrate and Second Substrate—

Each of the first substrate 10 and the second substrate 20 may be a single layer or a laminate including multiple layers as long as it supports the coating film for the wavelength conversion layer. It is preferable that each of the first substrate 10 and the second substrate 20 includes a barrier layer in order to protect the wavelength conversion layer from oxygen.

In the method of manufacturing a wavelength conversion member according to the present invention, it is preferable that at least one of the first substrate or the second substrate is a flexible film.

As the flexible film having a barrier function, a barrier film in which a barrier layer is formed on at least a single surface of a flexible support is preferably used.

It is preferable that the thickness of each of the first substrate 10 and the second substrate 20 is 10 to 100 μm. From the viewpoints of reducing the thickness of a product to which the wavelength conversion member is applied and preventing wrinkling, the thickness of each of the first substrate 10 and the second substrate 20 is still more preferably 15 μm to 60 μm. In addition, the first substrate 10 and the second substrate 20 have a width of, for example, 300 to 1500 mm. The thickness and width of each of the first substrate 10 and the second substrate 20 are appropriately selected depending on a product to which the wavelength conversion member is applied.

It is preferable that the polymerizable composition is applied in a narrower width than the width (substrate width) of the first substrate and the second substrate. It is preferable that the coating width of the polymerizable composition is narrower than the width (substrate width) of the first substrate and the second substrate by 10 to 200 mm.

The barrier film is not particularly limited and is generally configured to include a barrier layer in which one or more inorganic layers having barrier properties against oxygen or water are provided on at least a single surface of a flexible support formed of cellulose acylatecyclic olefin, an acrylic resin, a polyethylene terephthalate resin, a polycarbonate resin, or the like.

The barrier film may include a barrier layer having a laminate structure which includes at least one inorganic layer and at least one organic layer on the flexible support. From the viewpoint of improving weather fastness, it is preferable that multiple layers are laminated as described above because barrier properties can be further improved. On the other hand, as the number of layers laminated increases, the light transmittance of the wavelength conversion member is likely to decrease. Therefore, it is preferable to increase the number of layers laminated in a range where a high light transmittance can be maintained. Specifically, the total light transmittance of the barrier film in the visible range is preferably 80% or higher, and the oxygen permeability thereof is preferably 5.00 $cm^3/(m^2 \cdot day \cdot atm)$ or lower. The total light transmittance refers to an average light transmittance value in the visible range.

The oxygen permeability of the barrier film is more preferably 1 $cm^3/(m^2 \cdot day \cdot atm)$ or lower, still more preferably 0.1 $cm^3/(m^2 \cdot day \cdot atm)$ or lower, and still more preferably 0.01 $cm^3/(m^2 \cdot day \cdot atm)$ or lower.

The inorganic layer and the organic layer which constitute the barrier layer will be described.

Here, "inorganic layer" is a layer including an inorganic material as a major component and is preferably a layer consisting only of an inorganic material. On the other hand, "organic layer" is a layer including an organic material as a major component in which the content of the organic material is preferably 50 mass % or higher, more preferably 80 mass % or higher, and still more preferably 90 mass % or higher.

(Inorganic Layer)

The inorganic material constituting the inorganic layer is not particularly limited. For example, a metal or various inorganic compounds such as an inorganic oxide, an inorganic nitride, or an inorganic oxynitride can be used. As an element constituting the inorganic material, silicon, aluminum, magnesium, titanium, tin, indium, or cerium is preferable. The inorganic material may include one element or two or more elements among the above elements. Specific examples of the inorganic compound include silicon oxide, silicon oxynitride, aluminum oxide, magnesium oxide, titanium oxide, tin oxide, an indium oxide alloy, silicon nitride, aluminum nitride, and titanium nitride. In addition, as the inorganic layer, a metal film such as an aluminum film, a silver film, a tin film, a chromium film, a nickel film, or a titanium film may be provided. In addition, the organic layer may be provided adjacent to the inorganic layer. Mainly, the organic layer includes acrylate as a major component but may be include another material as long as it protects the inorganic layer.

In particular, it is more preferable that the inorganic layer having barrier properties includes at least one compound selected from silicon nitride, silicon oxynitride, silicon oxide, and aluminum oxide among the above materials. The inorganic layer formed of the above materials has excellent adhesiveness with the organic layer. Therefore, in a case where a pin hole is formed on the inorganic layer, the organic layer can be effectively embedded in the pin hole, and fracturing can be suppressed. Further, in a case where the inorganic layers are laminated, an extremely good inorganic film can be formed, and barrier properties can be further improved.

A method of forming the inorganic layer is not particularly limited. For example, various film forming methods in which a film forming material can be evaporated or scattered to be deposited on a deposition target surface can be used.

Examples of the method of forming the inorganic layer include: a vacuum deposition method of heating and depositing an inorganic material such as an inorganic oxide, an inorganic nitride, an inorganic oxynitride, or a metal; an oxidation deposition method of introducing oxygen gas and oxidizing an inorganic material as a raw material for deposition; a sputtering method of introducing argon gas and oxygen gas and sputtering an inorganic material as a target material for deposition; a physical vapor deposition method, such as an ion plating method, of heating an inorganic material with a plasma beam generated by a plasma gun for deposition; and in a case where a deposited film formed of silicon oxide or silicon nitride is formed, a chemical vapor deposition method of using an organic silicon compound as a raw material.

In addition, a silicon oxide film can also be formed using a low temperature chemical vapor deposition method in which an organic silicon compound is used as a raw material. Specific examples of the organic silicon compound include 1,1,3,3-tetramethyldisiloxane, hexamethyldisiloxane, vinyltrimethylsilane, hexamethyldisilane, methylsilane, dimethylsilane, trimethylsilane, diethylsilane, propylsilane, phenylsilane, vinyltriethoxysilane, tetramethoxysilane, phenyltriethoxysilane, methyltriethoxysilane, and octamethylcyclotetrasiloxane. In addition, among these organic silicon compounds, tetramethoxysilane (TMOS) or hexamethyldisiloxane (HMDSO) is preferably used. Tetramethoxysilane (TMOS) or hexamethyldisiloxane (HMDSO) is preferable from the viewpoints of handleability and excellent properties of a deposited film.

The thickness of the inorganic layer is 10 nm to 500 nm, preferably 10 nm to 300 nm, and more preferably 10 nm to 150 nm. By adjusting the thickness of the inorganic layer to be in the above-described range, reflection from the inorganic layer can be suppressed while realizing excellent barrier properties, and the wavelength conversion member having a high light transmittance can be provided.

(Organic Layer)

The details of the organic layer can be found in paragraphs "0020" to "0042" of JP2007-290369A and paragraphs "0074" to "0105" of JP2005-096108A. It is preferable that the organic layer includes a cardo polymer. As a result, adhesiveness between the organic layer and an adjacent layer, in particular, adhesiveness between the organic layer and the inorganic layer is improved, and more favorable gas barrier properties can be realized. The details of the cardo polymer can be found in paragraphs "0085" to "0095" of JP2005-096108A. The thickness of the organic layer is preferably in a range of 0.05 µm to 10 µm and more preferably in a range of 0.5 to 10 µm. In a case where the organic layer is formed using a wet coating method, the thickness of the organic layer is preferably in a range of 0.5 to 10 µm and more preferably in a range of 1 µm to 5 µm. In a case where the organic layer is formed using a dry coating method, the thickness of the organic layer is preferably in a range of 0.05 µm to 5 µm and more preferably in a range of 0.05 µm to 1 µm. By adjusting the thickness of the organic layer, which is formed using a wet coating method or a dry coating method, adhesiveness with the inorganic layer can be further improved.

Other details of the inorganic layer and the organic layer can be found in JP2007-290369A, JP2005-096108A, and US2012/0113672A1.

In addition, in the barrier film, optionally, for example, a scattering layer, a slipping property imparting layer, an anti-Newton's rings layer, various light reflecting layers, a light absorbing layer, or a light selective reflecting layer, may be provided on a surface opposite to the barrier layer including the inorganic layer and the organic layer with the substrate interposed therebetween. It is preferable that the scattering layer is a layer in which organic or inorganic particles are supported on various binders. In addition, the slipping property imparting layer may be a layer in which organic or inorganic particles are supported on various binders, or a binder layer including fluorine or silicon. In addition, the light reflecting layer, the light absorbing layer, or the light selective reflecting layer may be a layer to which a scattering or reflecting function is imparted by inorganic or organic particles, a layer to which an absorbing or reflecting function is imparted by a fine nanostructure, or a layer to which a reflecting function is imparted by a liquid crystal ordered structure.

Optionally, the scattering layer, the slipping property imparting layer, the anti-Newton's rings layer, various light reflecting layer, the light absorbing layer, the light selective reflecting layer, or the like may be provided on the same surface of the barrier film as that where the barrier layer is provided.

[Method and Device of Manufacturing Wavelength Conversion Member]

Hereinafter, embodiments of a method and a device of manufacturing the wavelength conversion member according to the present invention will be described.

—Method and Device of Manufacturing First Wavelength Conversion Member—

Figure 3:
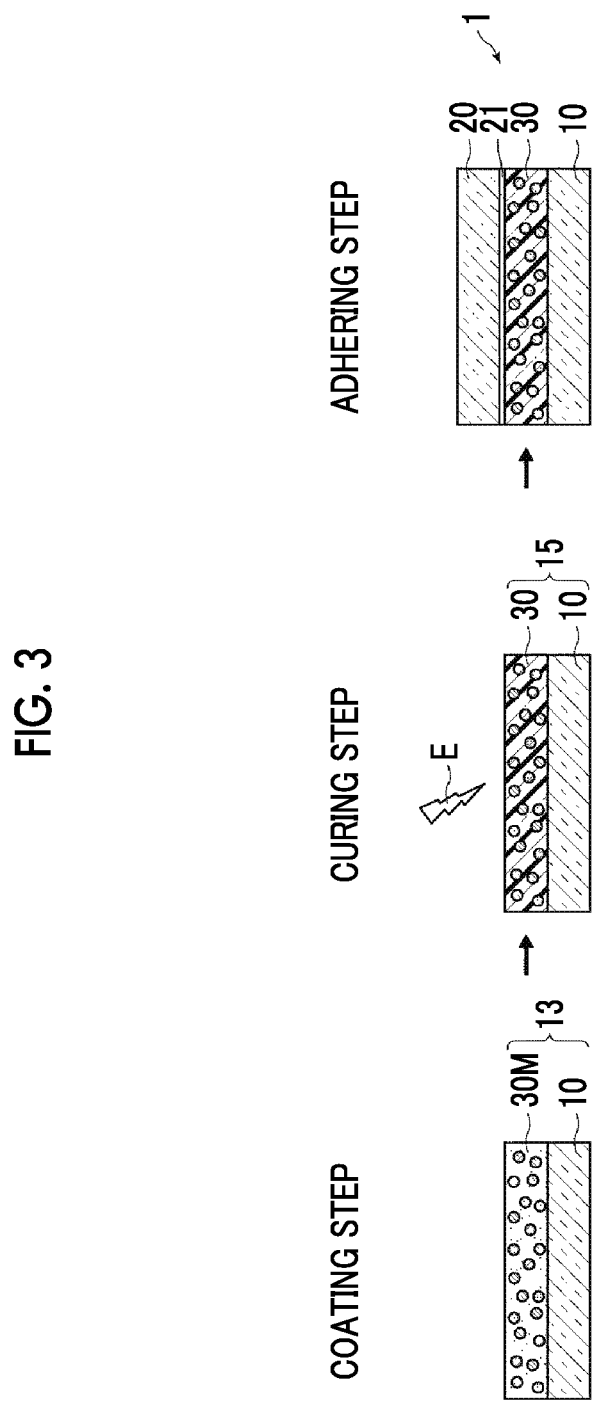
FIG. 3 is a schematic diagram showing steps of manufacturing the wavelength conversion member shown in FIG. 1.

FIG. 3 is a schematic diagram showing steps of manufacturing the wavelength conversion member 1 having the cross-section shown in FIG. 1. An embodiment of the method of manufacturing the first wavelength conversion member according to the present invention will be described with reference to FIG. 3. The method of manufacturing the first wavelength conversion member according to the present invention includes: preparing a polymerizable composition which includes at least the quantum dots and a polymerizable compound having a boiling point of 190° C. or lower and a molecular weight of 200 or lower (preparation step); forming a coating film 30M by applying the polymerizable composition including the quantum dots to a single surface of the first substrate 10 (coating step); forming the wavelength conversion layer 30 by irradiating the coating film 30M with active energy rays E to cure the coating film 30M while maintaining a film surface temperature T of the coating film 30M in a temperature range defined by 25° C.<T<(the boiling point of the polymerizable composition-5)° C. such that a laminated film 15 including the wavelength conversion layer 30 on the first substrate 10 is formed (curing step); and laminating the second substrate 20 on the wavelength conversion layer 30 with the adhesive layer 21 interposed therebetween such that the wavelength conversion layer 30 is interposed between the first substrate 10 and the second substrate 20 (adhering step). Through the above-described steps, the wavelength conversion member 1 is manufactured. Before the adhering step and immediately after the curing step, the content of the components having a molecular weight of 400 or lower in the wavelength conversion layer is adjusted to be 1% or lower with respect to the total weight of the wavelength conversion layer. As a result, after a predetermined period of time (for example, one day) or longer, a wavelength conversion member in which the number of bubble-shaped defect having a diameter of 0.1 mm or more in the wavelength conversion layer is 10 or less per 100 $cm^2$ can be manufactured.

Figure 4:
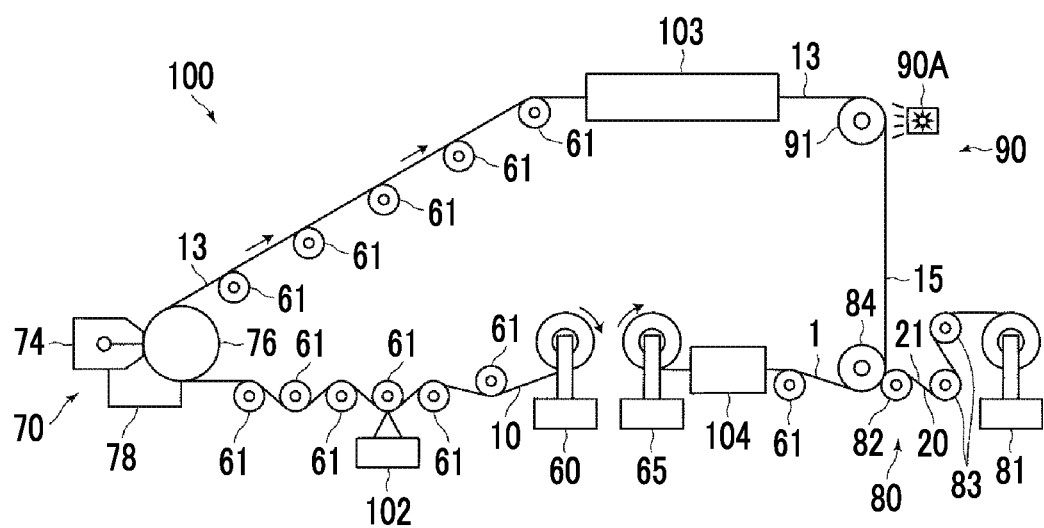
FIG. 4 is a diagram showing a schematic configuration of a wavelength conversion member manufacturing device for performing the manufacturing method shown in FIG. 3.

FIG. 4 is a diagram showing a schematic configuration example of a wavelength conversion member manufacturing device 100 for performing the method of manufacturing the wavelength conversion member 1 shown in FIG. 3.

The wavelength conversion member manufacturing device 100 is a roll-to-roll type manufacturing device including: a transporter 60 that transports the first substrate 10 while supporting it in a roll state; a plurality of transport rolls 61 for transporting a film-shaped workpiece; and a winder 65 that winds the wavelength conversion member 1, formed through the respective treatment steps, in a roll shape. In the wavelength conversion member manufacturing device 100, a coating portion 70, a curing portion 90, and an adhering portion (laminating portion) 80 are provided in this order between the transporter 60 and the winder 65. In the coating portion 70, the coating film 30M is formed by applying a polymerizable composition coating solution to a single surface of the first substrate 10. In the curing portion 90, the wavelength conversion layer 30 is formed by irradiating a laminated film 13, in which the coating film 30M is interposed between the first substrate 10 and the second substrate 20, with UV light as the active energy rays E to cure the coating film 30M. In the adhering portion 80, the second substrate 20 is adhered to the wavelength conversion layer 30 of the laminated film 15, in which the wavelength conversion layer 30 is formed on the first substrate 10, such that the wavelength conversion layer 30 is interposed between the first substrate 10 and the second substrate 20. Further, a dust remover 102 which removes dust from the coating surface of the first substrate 10 is provided between the transporter 60 and the coating portion 70; a drying device 103 for volatilizing a volatile component in the polymerizable composition is provided on the curing portion 90 side between the coating portion 70 and the curing portion 90; and an annealing portion 104 which performs a drying and annealing treatment is provided between the adhering portion 80 and the winder 65.

Each step of an embodiment of the method of manufacturing the wavelength conversion member according to the embodiment using the wavelength conversion member manufacturing device 100 will be described with reference to FIG. 4.

(Coating Step)

A specific aspect of the coating step in the coating portion 70 of the manufacturing device 100 will be described.

First, the first substrate 10 is continuously transported from the transporter 60 to the coating portion 70 at a transport speed of 1 to 50 m/min. In this case, the transport speed is not limited to the above value. During the transportation, for example, a tension of 20 to 150 N/m and preferably 30 to 100 N/m is applied to the first substrate 10. Next, optionally, various coating pre-treatments may be performed on front and back surfaces of the substrate. The coating pre-treatments include a heat treatment step and a press step for correcting wrinkles or elongation of the substrate, various discharge treatment steps and flame treatment steps for improving wettability of a surface, and a primary coating step for improving wettability as in the above steps. In addition, in a case where a protective sheet is adhered to the substrate, the pre-treatments also include a step of peeling the protective sheet and erasing charges. In this example, the first substrate 10 is transported to the coating portion 70 after removing dust from the coating surface of the first substrate 10 using the dust remover 102.

In the coating portion 70, the polymerizable composition (hereinafter, also referred to as "coating solution") is applied to a surface of the first substrate 10, which is continuously transported, to form the coating film 30M (refer to FIG. 3) thereon.

Using a liquid feeding device not shown in FIG. 4, the coating solution is supplied through a pipe connected to a die coater 74 of the coating portion 70. In the liquid feeding device, it is preferable that the polymerizable composition is filtered to remove coarse particles. The filtration accuracy is not particularly limited. A filter having a filtration accuracy of 1 to 200 μm can be used, and a filter having a filtration accuracy of 5 to 150 μm is preferably used. As the filter, for example, PROFILE II (manufactured by Pall Corporation) having a filtration accuracy of 100 μm can be used.

In the coating portion 70, for example, the die coater 74 and a backup roll 76 which is disposed to face the die coater 74 are provided. A surface of the first substrate 10 opposite to the surface on which the coating film 30M is formed is wound around the backup roll 76, and the coating solution is applied from a jetting port of the die coater 74 to the surface of the first substrate 10 which is continuously transported, to form the coating film 30M thereon.

In the die coater 74, a reduced pressure chamber 78 is provided and sets the pressure to be negative such that a thin coating film (also referred to as "bead") hanging between the die coater 74 and the substrate 10 wound around the backup roll 76 is prevented from being drawn and becoming unstable along with the transportation of the substrate 10. The negative pressure can be appropriately adjusted by adjusting the coating rate, the coating thickness, and the viscosity of the coating solution.

In the embodiment, the die coater 74 to which an extrusion coating method is applied is used as a coating device, but the present invention is not limited thereto. For example, coating devices to which various methods such as a curtain coating method, a rod coating method, or a roll coating method are applied can be used.

(Curing Step)

A specific aspect of the curing step in the curing portion 90 of the manufacturing device 100 will be described.

Here, a curing method using ultraviolet irradiation will be described. However, different kinds of active energy rays may be used. In a case where the polymerizable compound included in the polymerizable composition is polymerizable by heating, a polymerization treatment using heating such as blowing of warm air is performed.

In the curing portion 90, an active energy ray irradiating device 90A (hereinafter, referred to as "light irradiating device 90A") which irradiates the coating film 30M of the laminated film 13 with ultraviolet light is disposed, and a backup roll 91 is disposed to face the light irradiating device 90A with the laminated film 13 interposed therebetween. Here, the ultraviolet light refers to light in a wavelength range of 280 to 400 nm. As a light source which emits ultraviolet light, for example, a low-pressure mercury lamp, a middle-pressure mercury lamp, a high-pressure mercury lamp, a ultrahigh-pressure mercury lamp, a carbon arc lamp, a metal halide lamp, or a xenon lamp can be used. In addition, the backup roll 91 includes a temperature control device (not shown) such that the temperature of a surface of the backup roll 91 in contact with the laminated film 13 can be controlled.

The laminated film 13 in which the coating film 30M is formed on the first substrate 10 in the coating step is transported between the backup roll 91 and the light irradiating device 90A. The coating film 30M of the laminated film 13 is irradiated with ultraviolet light while the laminated film 13 is being transported in a state where the first substrate 10 side is wound around the backup roll 91. When irradiated with ultraviolet light by the light irradiating device 90A, the polymerizable compound in the coating film 30M is polymerized and cured to form the wavelength conversion layer 30.

Here, the state where the laminated film 13 is wound around the backup roll 91 refers to a state where the first substrate 10 is supported in contact with a surface of the backup roll 91 at a given lap angle. Accordingly, the first substrate 10 moves in synchronization with the rotation of the backup roll 91 while being continuously transported. The first substrate 10 only has to be wound around the backup roll 91 while at least being irradiated with ultraviolet light.

The irradiation dose of light irradiated by each light irradiating device may be set in a range where the polymerization reaction of the coating film can be performed. For example, the coating film 30M can be irradiated with ultraviolet light in an irradiation dose of preferably 100 to 10000 mJ/cm$^2$. The irradiation dose is preferably 100 to 2000 mJ/cm$^2$ and more preferably 100 to 1000 mJ/cm$^2$. The intensity of the light irradiation on the coating film is, for example, 30 to 2000 mW/cm$^2$, preferably 50 to 1000 mW/cm$^2$ and more preferably 100 to 500 mW/cm$^2$.

The temperature of the backup roll 91 can be determined in consideration of heat generation during the light irradiation, the curing efficiency of the coating film 30M, and the wrinkling of the first substrate 10 on the backup roll 91. The temperature of the backup roll 91 is set such that the film surface temperature T of the coating film 30M is in a temperature range defined by 25° C.<T<(the boiling point of the polymerizable composition-5)° C. and preferably 30° C.<T<(the boiling point of the polymerizable composition-10)° C. Here, the temperature of the roll refers to the temperature of the support which supports the non-coating film surface of the first substrate 10 and will also be referred to as the surface temperature of the roll.

Figure 5A:
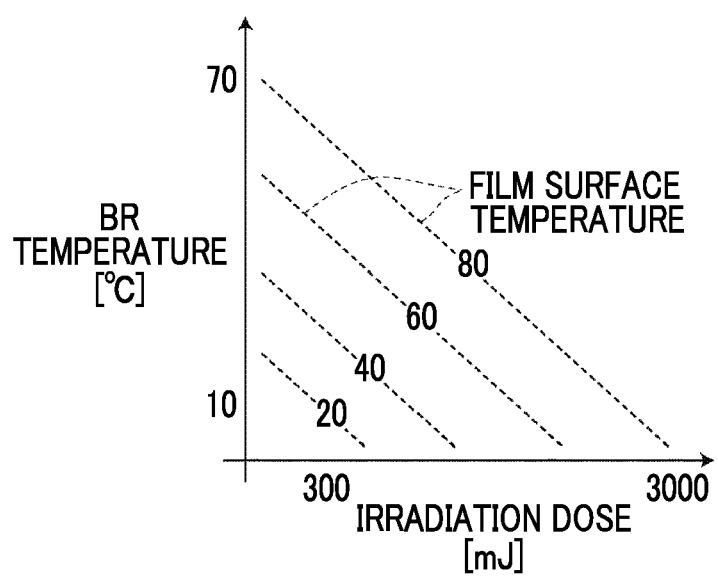
FIG. 5A is a graph showing the dependence of a film surface temperature of a coating film on a backup roll temperature and an irradiation dose in a curing step.

FIG. 5A is a graph showing an example of a relationship between the temperature of the backup roll (BR), the irradiation dose, and the film surface temperature of the coating film 30M. As shown in FIG. 5A, the film surface temperature T increases along with an increase in the irradiation dose and the BR temperature and increases by the irradiation dose with respect to the BR temperature. In the manufacturing device, the irradiation dose and the BR temperature may be set such that the film surface temperature is in the above-described range by obtaining the relationship between the BR temperature, the irradiation dose, and the film surface temperature in advance. The film surface temperature of the coating film 30M can be measured using a radiation thermometer.

The present inventors found that, in the method of manufacturing the first wavelength conversion member according to the present invention, by adjusting the film surface temperature T of the coating film 30M to be in the above-described temperature range, a unreacted monomer can be removed in the curing step, and the formation of bubbles in the wavelength conversion member after the formation of the wavelength conversion member can be suppressed (refer to Examples described below).

In a case where a polymerizable composition which includes a polymerizable compound having a molecular weight of 200 or lower is used, the reason for the formation of bubbles is considered to be that a unreacted monomer remaining after the curing of the polymerizable composition is volatilized and is held between the substrates. An unreacted monomer can be removed by increasing the film surface temperature as described above to some extent for heat drying during the curing step. Therefore, it is considered that, in the post steps, bubbles are not formed after the second substrate is laminated.

Figure 5B:
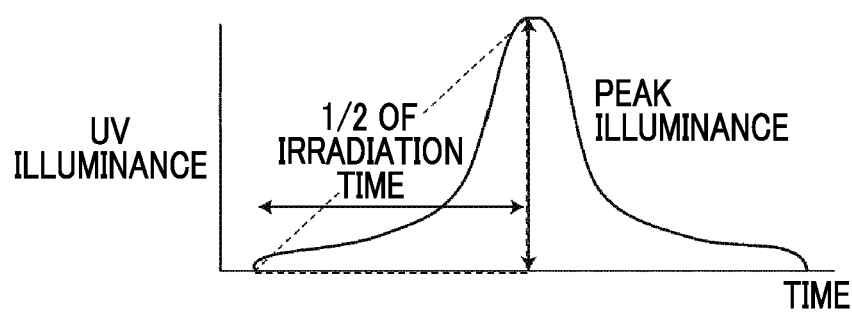
FIG. 5B is a graph showing an example of an UV irradiation method in the curing step.

FIG. 5B is a graph showing a preferable relationship between the UV illuminance and the irradiation time. As shown in FIG. 5B, a rising slope of illuminance, which is defined by a peak illuminance during irradiation of the ultraviolet light/(an irradiation time×½), can be controlled to be 500 mW/(cm$^2$·s) or lower.

The backup roll 91 includes a main body having a cylindrical shape and a rotating shaft that is disposed at opposite end portions of the main body. The diameter of the backup roll 91 is not particularly limited and is typically 100 to 1000 mm. In order to suppress bending stress applied to the substrate during curing described below and to suppress deformation such as curling, the diameter of the backup roll is preferably 300 mm or more and more preferably 450 mm or more. However, in a case where the diameter is excessively large, the upper limit is determined in consideration of the installation space, costs, and roll accuracy. Accordingly, the diameter is preferably 300 to 850 mm in consideration of curling of the wavelength conversion member, facility costs, and rotating accuracy.

Figure 6A:
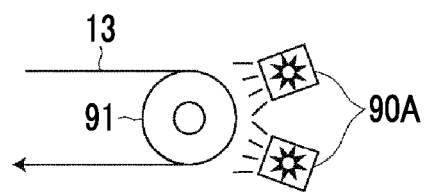
FIG. 6A is a diagram showing a configuration variation (first) of a curing portion of the wavelength conversion member manufacturing device.
Figure 6B:
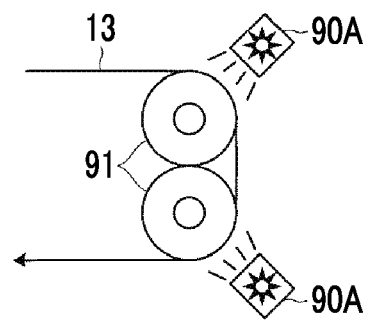
FIG. 6B is a diagram showing a configuration variation (second) of the curing portion of the wavelength conversion member manufacturing device.
Figure 6C:
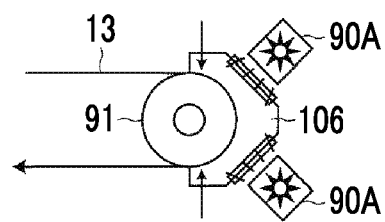
FIG. 6C is a diagram showing a configuration variation (third) of the curing portion of the wavelength conversion member manufacturing device.

FIGS. 6A to 6C are schematic diagrams showing configuration variations of the curing portion 90 of the manufacturing device 100.

As shown in FIG. 6A, in the curing portion 90, a plurality of light irradiating devices 90A may be provided.

In addition, as shown in FIG. 6B, not only the light irradiating devices 90A but also a plurality of backup rolls 91 may be provided.

In the examples shown in FIGS. 6A and 6B, in a case where a plurality of light irradiating devices (irradiation light sources) are provided, it is preferable that a reaction rate of the polymerizable compound included in the coating film, which is obtained by irradiation of the active energy rays emitted from a first irradiation light source, is set to be 10% to 80% with respect to a final reaction rate of the polymerizable compound, and then the coating film is irradiated with the active energy rays emitted from second and other irradiation light sources.

As shown in FIG. 6C, it is preferable that a step of covering the curing portion 90 with a nitrogen purge case 106 and curing the coating film 30M of the polymerizable composition is performed in an inert gas (here, nitrogen gas) having an oxygen concentration of 1% or lower. The nitrogen purge case 106 has an opening through which the laminated film 13 enters and exits and an opening through which nitrogen flows. As indicated by arrows in FIG. 6C, a configuration may be adopted in which nitrogen flows in directions from an entrance and an exit of the film to an ultraviolet irradiation region.

(Adhering Step)

A specific aspect of the adhering step in the adhering portion 80 of the manufacturing device 100 will be described.

After passing through the curing portion 90, the laminated film 15 in which the wavelength conversion layer 30 is formed on the first substrate 10 is transported to the adhering portion 80. In the adhering portion 80, the second substrate 20 is laminated on the wavelength conversion layer 30 with the adhesive layer 21 interposed therebetween.

As the adhesive layer 21, for example, a pressure sensitive adhesive (PSA) film or an optical clear adhesive (OCA) film can be used. In the embodiment, the laminated film 15 is continuously transported to the adhering portion 80 in a state where the adhesive layer 21 is applied to a single surface of the second substrate 20. In this case, the second substrate may be laminated after forming the adhesive layer on the wavelength conversion layer 30. In a case where a protective sheet is adhered to the adhesive layer, a step of peeling the protective sheet and erasing charges or the like is also performed. In addition, a particle layer for scattering light emitted from the wavelength conversion layer or an anti-Newton's rings layer may be formed on a surface of the second substrate on which the adhesive layer is not formed.

The adhering portion 80 includes two laminating rolls 82 and 84. The distance between the laminating rolls 82 and 84 is equal to or less than the total thickness of the wavelength conversion layer 30, the adhesive layer 21, and the second substrate 20 after curing the first substrate 10 and the coating film 30M. The laminate is interposed between the laminating rolls 82 and 84 such that the layers thereof are adhered to each other. In this case, it is preferable that the layers of the laminate are adhered to each other while elastically deforming at least one roll such that a pressure is applied to the laminate in which the second substrate 20 is laminated on the coating film 30M (which is disposed on the first substrate) with the adhesive layer 21 interposed therebetween. It is preferable that, among the two rolls, one roll is an elastically deformable roll and the other roll is a metal roll which is not elastically deformable. It is more preferable that, among the two laminating rolls 82 and 84, the roll 84 is an elastically deformable roll and the roll 82 is a metal roll which is not elastically deformable.

In this step, it is preferable that the second substrate is adhered to the coating film by nipping it at a linear pressure of 5 to 300 N/cm. The linear pressure is more preferably 10 to 100 N/cm and still more preferably 30 to 70 N/cm. An adhering method is not particularly limited, and an adhering method in which a nip roll is not used may be used.

In the adhering portion 80, regarding the laminated film 13 including the coating film 30M and the first substrate 10, a surface (that is, the first substrate 10 side surface) of the laminated film 13 opposite to the surface where the coating film 30M is formed is wound around the laminating roll 84 and is continuously transported to a laminating position. The second substrate 20 with the adhesive layer 21 transported from a transporter 81 for the second substrate, which winds the second substrate 20 in a roll shape and transports the second substrate 20 to the adhering portion 80, passes through the transport roll 83, is wound around the laminating roll 82, is continuously transported between the laminating roll 82 and the laminating roll 84, and is laminated on the wavelength conversion layer 30, which is formed on the first substrate 10, at the laminating position. The laminating position refers to a position where contact between the coating film 30M and the adhesive layer 21 applied to the single surface of the second substrate 20 starts.

Through the above-described steps, the wavelength conversion member 1 in which the first substrate 10, the wavelength conversion layer 30, the adhesive layer 21, and the second substrate 20 are laminated in this order can be manufactured. In the wavelength conversion member 1, oxygen barrier properties are excellent, and the formation of bubbles is suppressed. Optionally, in the post steps, the wavelength conversion member 1 undergoes a heat treatment or the like, is continuously transported to the winder 65, and is wound in a roll shape by the winder 65.

—Method and Device of Manufacturing Second Wavelength Conversion Member—

FIG. 7 is a schematic diagram showing steps of manufacturing the wavelength conversion member 11 having the cross-section shown in FIG. 2. An embodiment of the method of manufacturing the second wavelength conversion member according to the present invention will be described with reference to FIG. 7. The method of manufacturing the wavelength conversion member according to the embodiment includes: preparing a polymerizable composition which includes at least the quantum dots and a polymerizable compound having a boiling point of 190° C. or lower and a molecular weight of 200 or lower (preparation step); forming the first laminated film 13 by applying the polymerizable composition including the quantum dots to a single surface of the first substrate 10 to form the coating film 30M thereon (coating step); forming a second laminated film 14 by laminating the second substrate 20 on the coating film 30M such that the coating film 30M is interposed between the first substrate 10 and the second substrate 20 (adhering step); forming the wavelength conversion layer 30 by irradiating the coating film 30M with active energy rays to cure the coating film 30M while maintaining the film surface temperature T of the coating film 30M in a temperature range defined by 25° C.<T<(the boiling point of the polymerizable composition+15)° C. (curing step). Through the above-described steps, the wavelength conversion member 11 is manufactured. Immediately after the preparation of the wavelength conversion member 11 (immediately after curing step), the content of the components having a molecular weight of 400 or lower in the wavelength conversion layer is adjusted to be 1% or lower with respect to the total weight of the wavelength conversion layer. As a result, after a predetermined period of time (for example, one day) or longer, a wavelength conversion member in which the number of bubble-shaped defect having a diameter of 0.1 mm or more in the wavelength conversion layer is 10 or less per 100 cm$^2$ can be manufactured.

Figure 8:
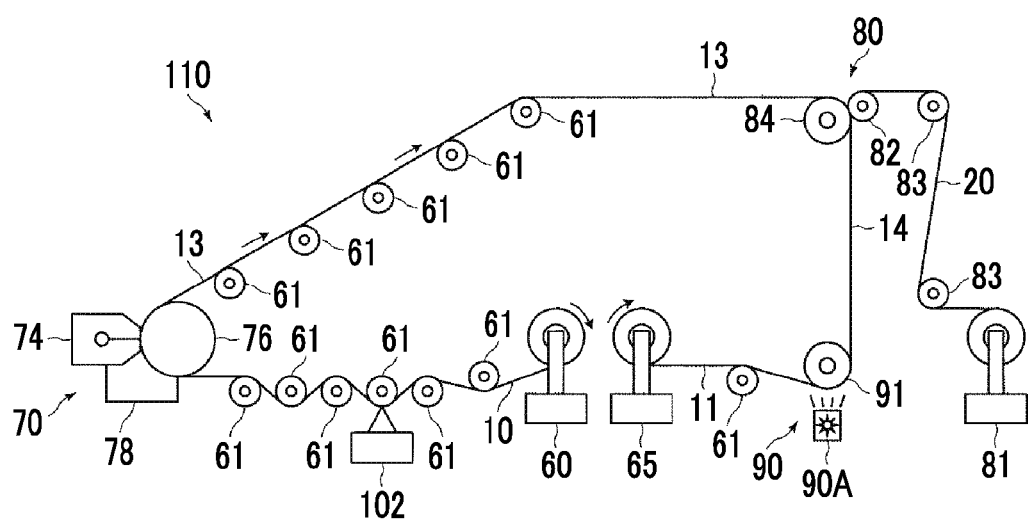
FIG. 8 is a diagram showing a schematic configuration of a wavelength conversion member manufacturing device for performing the manufacturing method shown in FIG. 7.

FIG. 8 is a diagram showing a schematic configuration example of a wavelength conversion member manufacturing device 110 for performing the method of manufacturing the wavelength conversion member 11 shown in FIG. 7.

The wavelength conversion member manufacturing device 110 is a roll-to-roll type manufacturing device including: the transporter 60 that transports the first substrate 10 while supporting it in a roll state; the plurality of transport rolls 61 for transporting a film-shaped workpiece; and the winder 65 that winds the wavelength conversion member 11, formed through the respective treatment steps, in a roll shape. In the wavelength conversion member manufacturing device 110, the coating portion 70, the adhering portion (laminating portion) 80, and the curing portion 90 are provided in this order between the transporter 60 and the winder 65. In the coating portion 70, the coating film 30M is formed by applying a polymerizable composition coating solution to a single surface of the first substrate 10. In the adhering portion 80, the second substrate 20 is adhered to the coating film 30M of the laminated film 13, in which the coating film 30M is formed on the first substrate 10, such that the coating film 30M is interposed between the first substrate 10 and the second substrate 20. In the curing portion 90, the laminated film 14, in which the coating film 30M is interposed between the first substrate 10 and the second substrate 20, is irradiated with UV light as the active energy rays E to cure the coating film 30M. Further, in the embodiment, the dust remover 102 which removes dust from the coating surface of the first substrate 10 is provided between the transporter 60 and the coating portion 70.

In the manufacturing device 110 shown in FIG. 8, components having the same functions as those of the manufacturing device 100 shown in FIG. 4 are represented by the same reference numerals.

In the manufacturing device 110, the second substrate 20 is adhered to the coating film 30M before curing the coating film 30M, the coating film 30M is cured by being irradiated with ultraviolet light by the light irradiating device 90A in the curing portion 90, and the wavelength conversion layer 30 is formed in a state where it is interposed between the first substrate 10 and the second substrate 20.

Each step of an embodiment of the method of manufacturing the wavelength conversion member according to the embodiment using the wavelength conversion member manufacturing device 110 will be described with reference to FIG. 8.

(Coating Step)

The coating step is the same as that of the above-described manufacturing device 100. The first substrate 10 is continuously transported to the coating portion 70, and the coating solution is applied to a surface of the first substrate 10 to form the coating film 30M (refer to FIG. 7) thereon.

(Adhering Step)

A specific aspect of the adhering step in the adhering portion 80 of the manufacturing device 110 will be described.

The configuration of the adhering portion 80 is substantially the same as that in the manufacturing device 100. However, the adhesive layer is not applied to the second substrate 20 transported to the laminating position.

In the adhering portion 80, regarding the laminated film 13 including the coating film 30M and the first substrate 10, a surface (that is, the first substrate 10 side surface) of the laminated film 13 opposite to the surface where the coating film 30M is formed is wound around the laminating roll 84 and is continuously transported to a laminating position. The second substrate 20 is transported from the transporter 81 for the second substrate, passes through the transport roll 83, is wound around the laminating roll 82, is continuously transported between the laminating roll 82 and the laminating roll 84, and is laminated on the coating film 30M, which is formed on the first substrate 10, at the laminating position. As a result, the coating film 30M is interposed between the first substrate 10 and the second substrate 20. Here, unlike the case of the above-described manufacturing device 100, the adhesive layer is necessary between the second substrate 20 and the coating film 30M.

(Curing Step)

A specific aspect of the curing step in the curing portion 90 of the manufacturing device 110 will be described.

The configuration of the curing portion 90 is the same as that in the manufacturing device 100, except that the curing portion 90 is provided downstream of the adhering portion 80. In this case, the coating film 30M is irradiated with active energy rays E not directly but through the substrate.

The laminated film 14, in which the coating film 30M is interposed between the first substrate 10 and the second substrate 20, which is obtained in the adhering step is continuously transported to the curing portion 90. The laminated film 14 is transported between the backup roll 91 and the first light irradiating device 90A. The coating film 30M of the laminated film 14 is irradiated with ultraviolet light from the second substrate 20 side while the laminated film 14 is being transported in a state where the first substrate 10 side is wound around the first backup roll 91. When irradiated with ultraviolet light by the light irradiating device, the polymerizable compound in the coating film 30M is polymerized and cured to form the wavelength conversion layer 30.

The temperature of the backup roll 91 can be determined in consideration of heat generation during the light irradiation, the curing efficiency of the coating film 30M, and the wrinkling of the first substrate 10 on the backup roll 91. In this example, the temperature of the backup roll 91 is set such that the film surface temperature T of the coating film 30M is in a temperature range defined by 25° C.<T<(the boiling point of the polymerizable composition+15)° C. and preferably 30° C.<T<(the boiling point of the polymerizable composition-5)° C.

The present inventors found that, in the method of manufacturing the second wavelength conversion member according to the present invention, by adjusting the film surface temperature T of the coating film 30M to be in the above-described temperature range, a unreacted monomer can be removed in the curing step, and the formation of bubbles in the wavelength conversion member after the formation of the wavelength conversion member can be suppressed (refer to Examples described below).

In a case where a polymerizable composition which includes a polymerizable compound having a molecular weight of 200 or lower is used, the reason for the formation of bubbles is considered to be that a unreacted monomer remaining after the curing of the polymerizable composition is volatilized and is held between the substrates. In this manufacturing method, the polymerization ratio can be improved and an unreacted monomer can be removed by increasing the film surface temperature as described above to some extent during the curing step. Therefore, it is considered that, in the post steps, bubbles are not formed after the second substrate is laminated.

In this manufacturing method, as shown in FIG. 5A, the film surface temperature T increases along with an increase in the irradiation dose and the BR temperature and increases by the irradiation dose with respect to the BR temperature. In the manufacturing device, the irradiation dose and the BR temperature may be set such that the film surface temperature is in the above-described range by obtaining the relationship between the BR temperature, the irradiation dose, and the film surface temperature in advance. Here, the film surface refers to an interface of the coating film 30M with the second substrate 20. The film surface temperature of the coating film 30M covered with the second substrate 20 can be measured by interposing the interface portion between temperature detecting sheets (for example, THERMO LABEL, manufactured by NiGK Corporation).

In addition, in the manufacturing method, as shown in FIG. 5B, a rising slope of illuminance, which is defined by a peak illuminance during irradiation of the ultraviolet light/(an irradiation time×½), can be controlled to be 500 mW/(cm$^2$·s) or lower.

In addition, various variations of the curing portion 90 shown in FIGS. 6A to 6C can also be applied to the manufacturing device 110.

By curing the coating film 30M in the curing step, the wavelength conversion member 11 as the laminate in which the first substrate 10, the wavelength conversion layer 30 as the cured layer, and the second substrate 20 are laminated can be manufactured. In the wavelength conversion member 1, oxygen barrier properties are excellent, and the formation of bubbles is suppressed. Optionally, in the post steps, the wavelength conversion member 11 undergoes a heat treatment or the like, is continuously transported to the winder 65, and is wound in a roll shape by the winder 65.

[Backlight Unit]

A backlight unit according to an aspect of the present invention includes at least the wavelength conversion member according to the present invention and a light source. The details of the wavelength conversion member are as described above.

Figure 9:
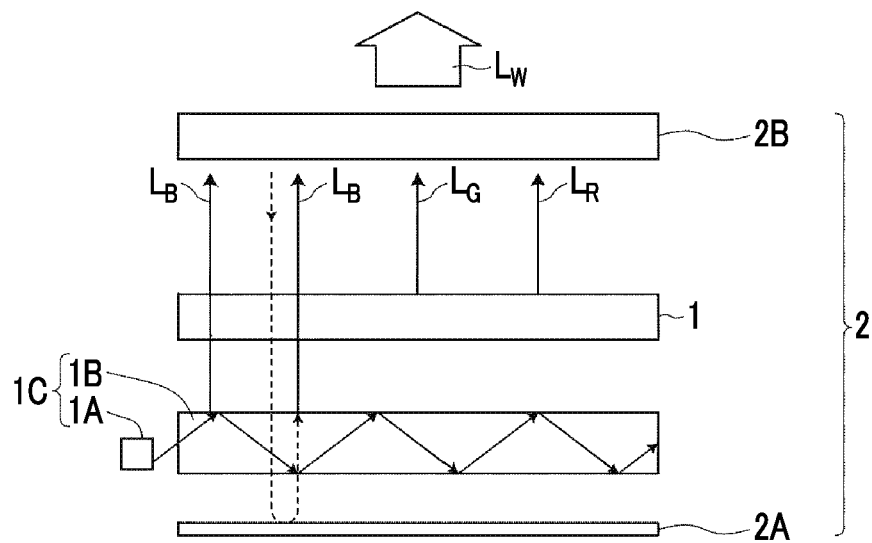
FIG. 9 is a diagram showing a schematic configuration of a backlight unit.

FIG. 9 is a cross-sectional view showing an example of a backlight unit 2 including the wavelength conversion member 1 according to the aspect of the present invention.

As shown in FIG. 9, the backlight unit 2 includes: a surface light source portion 1C that emits blue light $L_B$ as excitation light; a sheet-shaped wavelength conversion member 1 on which the blue light $L_B$ emitted from the surface light source portion 1C is incident and that converts at least a portion of the blue light $L_B$ into green light $L_G$ and red light $L_R$ and allows transmission of a portion of the blue light $L_B$; and a retroreflecting member 2B that is disposed to face a light guide plate 1B described below with the wavelength conversion member 1 interposed therebetween; and a reflection plate 2A that is disposed to face the wavelength conversion member 1 with the light guide plate 1B interposed therebetween.

The surface light source portion 1C includes: the sheet-shaped light guide plate 1B; and a light source 1A that emits blue light and is disposed at an edge portion of the light guide plate 1B such that the excitation light is incident from the edge of the light guide plate 1B.

Here, the wavelength conversion layer 30 of the wavelength conversion member 1 includes, as the quantum dots 31, quantum dots that emit the red light $L_R$ when irradiated with the blue light $L_B$ and quantum dots that emit the green light $L_G$ when irradiated with the blue light $L_B$.

In the backlight unit 2 shown in FIG. 9, the primary light $L_B$ emitted from the surface light source portion 1C is incident on the wavelength conversion member 1. In the wavelength conversion member 1, at least a portion of the primary light $L_B$ as the excitation light is converted into the red light and the green light, and secondary light including the red light and the green light is emitted. $L_B$, $L_G$, and $L_R$ emitted from the wavelength conversion member 1 are incident on the retroreflecting member 2B, and each incident light is repeatedly reflected between the retroreflecting member 2B and the reflection plate 2A and passes through the wavelength conversion member 1 multiple times. As a result, in the wavelength conversion member 1, a sufficient amount of the excitation light (blue light $L_B$) is absorbed by the quantum dots 31, a sufficient amount of fluorescence ($L_G$, $L_R$) is emitted, and white light $L_W$ is realized and emitted from the retroreflecting member 2B, that is, the backlight unit 2.

As the light source 1A, for example, a light emitting diode or a laser light source which emits blue light having a center emission wavelength in a wavelength range of 430 nm to 480 nm can be used.

As the light source 1A, a light emitting diode which emits ultraviolet light can also be used. In this case, the wavelength conversion layer 30 of the wavelength conversion member 1 may include, as the quantum dots 31, quantum dots that emit the blue light $L_B$ when irradiated with ultraviolet light, quantum dots that emit the red light $L_R$ when irradiated with ultraviolet light, and quantum dots that emit the green light $L_G$ when irradiated with ultraviolet light.

As shown in FIG. 9, the surface light source portion 1C may include: the light source 1A; and the light guide plate 1B that guides and emits the primary light emitted from the light source 1A. Alternatively, the surface light source portion 1C may include: the light source 1A that is disposed along with a plane parallel to the wavelength conversion member 1; and a diffusion plate that is provided instead of the light guide plate 1B. The former surface light source portion is called an edge light mode, and the latter surface light source portion is called a direct backlight mode.

In addition, as the reflection plate 2A, a well-known reflection plate can be used without any particular limitation. The details of the reflection plate 2A can be found in JP3416302B, JP3363565B, JP4091978B, and JP3448626B, the contents of which are incorporated herein by reference.

The retroreflecting member 2B may be formed of a well-known diffusion plate, a diffusion sheet, a prism sheet (for example, BEF series, manufactured by Sumitomo 3M Ltd.), or a light guide. The configuration of the retroreflecting member 2B can be found in JP3416302B, JP3363565B, JP4091978B, and JP3448626B, the contents of which are incorporated herein by reference.

"Liquid Crystal Display Device"

Figure 10:
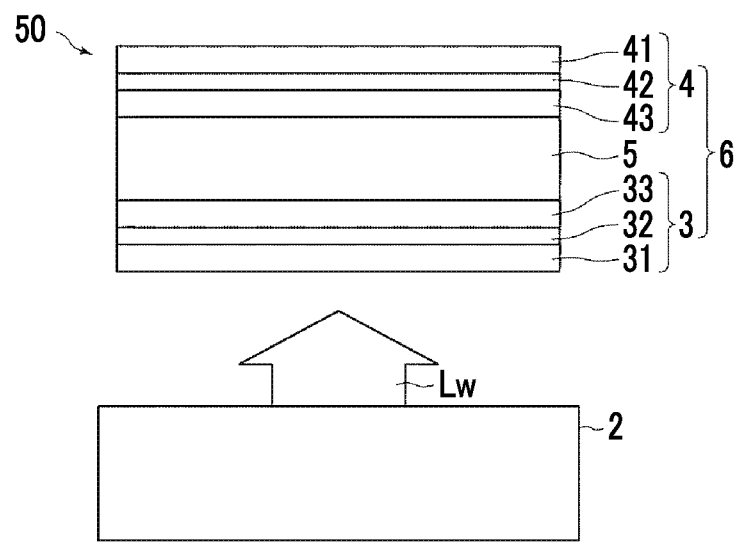
FIG. 10 is a diagram showing a schematic configuration of a liquid crystal display device.

The above-described backlight unit 2 can be applied to a liquid crystal display device. As shown in FIG. 10, a liquid crystal display device 50 includes: the backlight unit 2 according to the embodiment; and a liquid crystal cell unit 6 that is disposed to face the retroreflecting member side of the backlight unit 2.

In the liquid crystal cell unit 6, as shown in FIG. 10, a liquid crystal cell 5 is interposed between polarizing plates 3 and 4. In the polarizing plates 3 and 4, opposite main surfaces of polarizers 32 and 42 are protected by polarizing plate protective films 31 and 33 and polarizing plate protective films 41 and 43, respectively.

Regarding each of the liquid crystal cell 5, the polarizing plates 3 and 4, and other components which constitute the liquid crystal display device 50, a product prepared using a well-known method or a commercially available product can be used without any particular limitation. In addition, of course, a well-known interlayer such as an adhesive layer can be provided between respective layers.

As a driving mode of the liquid crystal cell 5, various modes such as a twisted nematic (TN) mode, a super twisted nematic (STN) mode, a vertical alignment (VA) mode, an in-plane switching (IPS) mode, or an optically compensated bend (OCB) mode can be used without any particular limitation. The liquid crystal cell is preferably a VA mode, an OCB mode, an IPS mode, or a TN mode but is not limited thereto. Examples of the configuration of the VA mode liquid crystal display device include a configuration shown in FIG. 2 described in JP2008-262161A. However, a specific configuration of the liquid crystal display device is not particularly limited, and a well-known configuration can be adopted.

Optionally, the liquid crystal display device 50 further includes an optical compensation member for optical compensation or a sub-functional layer such as an adhesive layer. Further, in addition to (or instead of) a color filter substrate, a thin film transistor substrate, a lens film, a diffusion sheet, a hard coat layer, an anti-reflection layer, a low-reflection layer, or an anti-glare layer, a surface layer such as a forward scattering layer, a primer layer, an antistatic layer, or an undercoat layer may be disposed.

The liquid crystal display device according to the aspect of the present invention includes the backlight unit including the wavelength conversion member according to the present invention in which curling is suppressed. Therefore, high brightness and high color reproducibility can be stably realized.

EXAMPLES

Hereinafter, wavelength conversion members according to Examples of the present invention and Comparative Examples, and methods of manufacturing the same will be described.

(Preparation of Barrier Film)

As a support, a polyethylene terephthalate film (PET film; trade name: COSMOSHINE (registered trade name) A4300, manufactured by Toyobo Co., Ltd.) having a thickness of 50 μm was used, and an organic layer and an inorganic layer were formed in this order on a single surface of the support in the following procedure.

Trimethylolpropane triacrylate (TMPTA, manufactured by Daicel-Cytec Co., Ltd.) and a photopolymerization initiator (ESACURE KTO 46, manufactured by Lamberti S.p.A.) were prepared and were weighed such that a mass ratio thereof was 95:5. These components were dissolved in methyl ethyl ketone. As a result, a coating solution having a solid content concentration of 15% was obtained. This coating solution was applied to the above-described PET film using a roll-to-roll method with a die coater and was allowed to pass through a drying zone at 50° C. for 3 minutes. Next, in a nitrogen atmosphere, the coating solution was irradiated with ultraviolet light (cumulative irradiation dose: about 600 mJ/cm$^2$) to be cured, and the PET film was wound. The thickness of the first organic layer formed on the support was 1 μm.

Next, using a roll-to-roll CVD apparatus, an inorganic layer (silicon nitride layer) was formed on a surface of the organic layer. As raw material gases, silane gas (flow rate: 160 sccm), ammonia gas (flow rate: 370 sccm), hydrogen gas (flow rate: 590 sccm), and nitrogen gas (flow rate: 240 sccm) were used. As a power supply, a high-frequency power supply having a frequency of 13.56 MHz was used. The film forming pressure was 40 Pa, and the achieved thickness was 50 nm.

Through the above-described procedure, a barrier film in which the organic layer and the inorganic layer were formed in this order on the single surface of the support was prepared. In the following description, this barrier film was used as a first substrate and a second substrate.

Example 1-1

(Polymerizable Composition Coating Solution)
The following polymerizable composition was prepared.
[Polymerizable Composition]
Toluene dispersion (maximum emission wavelength: 520 nm) including quantum dots 1: 10 parts by mass
Toluene dispersion (maximum emission wavelength: 630 nm) including quantum dots 2: 1 part by mass
Methyl methacrylate (manufactured by Mitsubishi Gas Chemical Company Inc.): 100 parts by mass
Photopolymerization initiator IRGACURE 819 (manufactured by BASF SE): 1 part by mass
Viscosity adjuster AEROSIL R972 (manufactured by Nippon Aerosil Co., Ltd.): 3 parts by mass
(In the above description, the quantum dot concentration in the toluene dispersion including the quantum dots 1 or 2 was 1 mass %)

The molecular weight of the methyl methacrylate as a polymerizable compound in the polymerizable composition had a molecular weight of 86.1 and a boiling point of 80.5° C.

<Coating Pre-Treatment>
10 L of the polymerizable composition was stirred in a dissolver at 150 rpm for about 30 minutes, and concurrently ultrasonic defoaming was performed (using a ultrasonic transmitter BRANSONIC 8800 (manufactured by Branson Ultrasonics, Emerson Japan, Ltd.), ultrasonic waves were applied to the solution in a plastic container through water under conditions of ultrasonic power: 280 W and frequency: 40 kH). As a result, a polymerizable composition for the coating solution was prepared.

A wavelength conversion member was prepared through the manufacturing steps described with reference to FIGS. 3 and 4. Hereinafter, the respective steps of the manufacturing method will be described in detail.

<Coating Step>
Using a diaphragm pump, the coating solution was supplied to a die coater (reference numeral 74 in FIG. 4) through a pipe having a length of about 2.5 m. During the supply, the coating solution was filtered through a filter (PROFILE II, 100 μm, manufactured by Pall Corporation) as a filtration member having a height of 1 inch and a filtration accuracy 100 μm to remove coarse particles therefrom. The coating solution was applied to a first substrate (reference numeral 10 in FIG. 8) having a width of 700 mm to form a coating film having a width of 600 mm. As the first substrate, the barrier film prepared in the above-described procedure was used.

<Curing Step>
A laminated film (reference numeral 13 in FIG. 4) in which the coating film (reference numeral 30M in FIG. 3) was formed on the first substrate 10 was transmitted to a backup roll (reference numeral 91 in FIG. 4), and the coating film was cured by UV irradiation (irradiation dose: 300 mJ/cm$^2$) to form a wavelength conversion layer. The curing step was performed in a state where a single surface of the coating film was exposed to air (oxygen concentration: 20.6%). In addition, at this time, the temperature (set temperature) of the backup roll was set as 15° C., and the film surface temperature during the ultraviolet irradiation was 25° C. Here, the film surface was the exposed surface of the coating film. The ultraviolet irradiation dose was measured using an UV illuminance meter (UV METER UVPF-A1; manufactured by Eye Graphics Co., Ltd.). The film surface temperature during the ultraviolet irradiation was measured using a radiation thermometer (IR-TA, manufactured by Chino Corporation).

<Adhering (Laminating) Step>
After the curing step, as a second substrate (reference numeral 20 in FIG. 4), the same barrier film having a width of 700 mm as the first substrate was used. A laminate having a width of 700 mm in which an optical clear adhesive (OCA) film (trade name: 8172 CL, manufactured by Sumitomo 3M Ltd.) was adhered to the second substrate in advance was transmitted from a transporter (reference numeral 81 in FIG. 4) for the second substrate was laminated on the coating film of the wavelength conversion layer as the cured layer. Specifically, the second substrate 20 was adhered to the coating film 30M by nipping them between a metal roll (having a diameter of 200 mm; the laminating roll 84 in FIG. 4) and a nip roll formed of natural rubber (having a diameter of 200 mm; hardness: 75 degrees; the laminating roll 82 in FIG. 4) at a linear pressure of 50 N/cm. At this time, the circumferential speeds of the two rolls were controlled such that a ratio of the circumferential speed of the laminating roll 84 to the circumferential speed of the laminating roll 82 was 100.0%. Through the above-described step, a wavelength conversion member according to Example 1-1 having the cross-section shown in FIG. 1 was prepared.

Examples 1-2 to 1-5 and Comparative Example 1-1

Wavelength conversion members according to Examples 1-2 to 1-5 and Comparative Example 1-1 were prepared using the same method as in Example 1-1, except that the UV irradiation dose, temperature conditions, and oxygen concentration in the curing step were changed as shown in Table 1. In Examples 1-2 to 1-4 and Comparative Example 1-1, the curing step was performed in a state where a single surface of the wavelength conversion layer was exposed to air (oxygen concentration: 20.6%) as in the case of Example 1-1. In Example 1-5 and Comparative Example 1-2, the curing step was performed in a state where a single surface of the wavelength conversion layer was exposed to nitrogen gas (oxygen concentration: lower than 1%) as in the case of Example 1-1. The coating rate was changed as needed in order to obtain the ultraviolet irradiation dose corresponding to each of Examples and Comparative Examples.

Comparative Example 1-2

(Polymerizable Composition Coating Solution)
The following polymerizable composition was prepared.
[Polymerizable Composition]
Toluene dispersion (maximum emission wavelength: 520 nm) including quantum dots 1: 10 parts by mass
Toluene dispersion (maximum emission wavelength: 630 nm) including quantum dots 2: 1 part by mass
Lauryl acrylate (manufactured by Mitsubishi Gas Chemical Company Inc.): 65 parts by mass
Trimethylolpropane triacrylate (manufactured by Daicel-Cytec Co., Ltd.): 35 parts by mass
Photopolymerization initiator IRGACURE 819 (manufactured by BASF SE): 1 part by mass
Viscosity adjuster AEROSIL R972 (manufactured by Nippon Aerosil Co., Ltd.): 2 parts by mass
(In the above description, the quantum dot concentration in the toluene dispersion including the quantum dots 1 or 2 was 1 mass %)
Using the polymerizable composition coating solution, a wavelength conversion members according to Comparative Example 1-2 was prepared using the same method as in Example 1-1, except that the irradiation dose and temperature conditions in the curing step were changed as shown in Table 1. In Comparative Example 1-2, the lauryl acrylate had a molecular weight of 240.4 and a boiling point of 263° C., and the trimethylolpropane triacrylate had a molecular weight of 296.3 and a boiling point of 315° C.

Example 2-1

A wavelength conversion member was prepared through the manufacturing steps described with reference to FIGS. 7 and 8. Hereinafter, the respective steps of the manufacturing method will be described in detail. The polymerizable composition and the coating pre-treatment were the same as in Example 1-1.
<Coating Step>
Using a diaphragm pump, the polymerizable composition for the coating solution (hereinafter, referred to as "coating solution") was supplied to a die coater (reference numeral 74 in FIG. 8) through a pipe having a length of about 2.5 m. During the supply, the coating solution was filtered through a filter (PROFILE II, 100 μm, manufactured by Pall Corporation) as a filtration member having a height of 1 inch and a filtration accuracy 100 μm to remove coarse particles therefrom. The coating solution was applied to a first substrate (reference numeral 10 in FIG. 8) having a width of 700 mm to form a coating film having a width of 600 mm. As the first substrate, the barrier film prepared in the above-described procedure was used.
<Adhering Step>
After the coating step, as the second substrate (reference numeral 20 in FIG. 8), the same barrier film (total thickness: 50 μm) having a width of 700 mm as the first substrate was transported from the transporter (reference numeral 81 in FIG. 8) for the second substrate, and the second substrate was laminated on the coating film. Specifically, immediately before the curing step of forming the wavelength conversion layer, the barrier film as the second substrate was adhered to the coating film by nipping them between a metal roll (having a diameter of 200 mm; the laminating roll 84 in FIG. 8) and a nip roll formed of natural rubber (having a diameter of 200 mm; hardness: 75 degrees; the laminating roll 82 in FIG. 8). In this case, a minimum gap between the metal roll and the nip roll formed of natural rubber was set as 3 mm. At this time, the circumferential speeds of the two rolls were controlled such that a ratio of the circumferential speed of the laminating roll 84 to the circumferential speed of the laminating roll 82 was 100.0%±1%.

In addition, in a period from the lamination of the second substrate on the coating film to the curing of the coating film, the temperature of the first substrate was controlled to 50° C., and the temperature of the second substrate was controlled to 60° C.
<Curing Step>
After the adhering step, on the backup roll (reference numeral 91 in FIG. 8) for UV irradiation, the coating film interposed between the first substrate and the second substrate was cured by UV irradiation (irradiation dose: 500 mJ/cm$^2$) to form a wavelength conversion layer. As a result, a wavelength conversion member according to Example 2-1 having the cross-section shown in FIG. 2 was prepared. The curing step was performed in air (oxygen concentration: 20.6%). In addition, at this time, the temperature of the backup roller was 20° C., and the film surface temperature of the coating film 30M was 40° C. The film surface of the coating film 30M was an interface on the substrate 20 side.

The ultraviolet irradiation dose was measured using an UV illuminance meter (UV METER UVPF-A1; manufactured by Eye Graphics Co., Ltd.). The film surface temperature was measured after interposing the interface portion between THERMO LABELs (manufactured by NiGK Corporation).

Examples 2-2 and 2-3 and Comparative Examples 2-1 and 2-2

Wavelength conversion members according to Examples 2-2 and 2-3 and Comparative Example 2-1 and 2-2 were prepared using the same method as in Example 2-1, except that the UV irradiation dose and temperature conditions in the curing step were changed as shown in Table 1. The coating rate was changed as needed in order to obtain the ultraviolet irradiation dose corresponding to each of Examples and Comparative Examples.

Each of the wavelength conversion members according to Examples and Comparative Examples prepared as described above was measured and evaluated as follows.

(Measurement of Oxygen Permeability co-efficient of Wavelength Conversion Layer)

The oxygen permeability co-efficient of each of the wavelength conversion members prepared in Examples and Comparative Examples was measured by separately preparing a sample for the measurement of oxygen permeability co-efficient in the following procedure.

The coating solution prepared in the above procedure was applied to a non-coating surface of a polyethylene terephthalate film (PET film; trade name: COSMOSHINE (registered trade name) A4100, manufactured by Toyobo Co., Ltd.) having a thickness of 50 μm using a #40 wire bar. While performing nitrogen purge, the coating film was cured by irradiating a coating surface with ultraviolet light using an air-cooled metal halide lamp (manufactured by Eye Graphics Co., Ltd.) of 1200 W/cm under conditions of each of Examples and Comparative Examples, and the coating layer was peeled off from the PET film. As a result, the wavelength conversion layer sample according to each of Examples and Comparative Examples having a thickness of 50 μm was prepared.

The oxygen permeability co-efficient of the wavelength conversion layer sample was measured in an atmosphere of 23° C. and 50% RH according to JIS-K7126 (isopiestic method) using an oxygen permeability co-efficient measuring device OX-TRAN 2/21MH (manufactured by Mocon Inc.). RH represents relative humidity. The measured oxygen permeability co-efficient of each of the wavelength conversion layer samples is shown in Table 1.

(Evaluation of Bubbles)

Whether or not bubbles were formed in the wavelength conversion member in each of Examples and Comparative Examples was measured in the following procedure. Next, a center portion of each of the wavelength conversion members in a width direction was cut into a size of 10 cm×10 cm and was heated in an environment of 105° C. and a relative humidity of lower than 5% for 24 hours. Each of the wavelength conversion members was placed on a commercially available blue light source (OPSM-H150X142B, manufactured by OPTEX FA Co., Ltd.), and the number N of bubbles present therein was measured by visual inspection and was evaluated based on the following evaluation criteria. Bubbles having a diameter of 0.1 mm or more were counted.

<Evaluation Criteria>

A: N<1 per 100 $cm^2$
B: 1 per 100 $cm^2 \leq N < 10$ per 100 $cm^2$
C: 5 per 100 $cm^2 \leq N < 10$ per 100 $cm^2$
D: 10 per 100 $cm^2 \leq N$ (Measurement of Thickness)

The thickness of the wavelength conversion layer in the wavelength conversion member in each of Examples and Comparative Examples was measured in the following procedure. First, a cross-section of the wavelength conversion member at an arbitrary position was cut using a microtome (ULTRAMICROTOME UC6, Leica Microsystems Ltd.), and the thickness of the wavelength conversion layer was measured using an optical microscope.

(Measurement of Content of Components having Molecular Weight of 400 or Lower)

The content of components having a molecular weight of 400 or lower in the wavelength conversion member prepared in each of Examples and Comparative Examples was measured while residual components were not volatilized after separately preparing a sample for the measurement of the residual components.

<Preparation of Measurement Samples of Wavelength Conversion Members According to Examples 1-1 to 1-5 and Comparative Examples 1-1 and 1-2>

By performing the coating step and the curing step using the same method as that of the preparation of the wavelength conversion member according to each of Examples and Comparative Examples, a measurement sample was prepared. At this time, in Examples 1-1 to 1-4 and Comparative Example 1-1, the curing step was performed in a state where a single surface of the wavelength conversion layer was exposed to air (oxygen concentration: 20.6%). In Example 1-5 and Comparative Example 1-2, the curing step was performed in a state where a single surface of the wavelength conversion layer was exposed to nitrogen gas (oxygen concentration: lower than 1%) as in the case of Example 1-1. Next, a laminated film was adhered to a surface of the wavelength conversion layer, which was not in contact with the substrate, in order to prevent volatilization of the residual components from the sample and was peeled off immediately before measuring the weight of the residual components.

<Preparation of Measurement Samples of Wavelength Conversion Members according to Examples 2-1 to 2-3 and Comparative Examples 2-1 and 2-2>

By performing the coating step, the adhering step, and the curing step using the same method as that of the preparation of the wavelength conversion member according to each of Examples and Comparative Examples, a measurement sample was prepared. Immediately before measuring the weight of the residual components, the second substrate was peeled off from the measurement sample.

<Measurement of Residual Components (Volatile Components)>

Using TG-DTA 2000S (manufactured by Mac Science Co., Ltd.), the sample prepared in the above procedure was heated from 25° C. to 150° C. at a rate of 20° C./min and was held at 150° C. for 1 hour. At this time, a weight change rate X (%) was measured.

<Measurement of Content of Components having Molecular Weight of 400 or Lower>

In the sample (another sample having the same conditions as those used in the measurement of the weight) prepared in the above procedure, the molecular weight distribution of the volatile components was measured using a gas chromatography-mass spectrometer GCMS (manufactured by Shimadzu Corporation) under conditions of 150° C. and gas expulsion time: 1 hour. By comparing the areas in the measured molecular weight distribution to each other, a content Y (%) of components having a molecular weight of 400 or lower in the volatile components was calculated.

Based on the weight change rate X measured in the above procedure and the content Y of the components having a molecular weight of 400 or lower in the volatile components, a content A of the components having a molecular weight of 400 or lower in the wavelength conversion layer of the wavelength conversion member according to each of Examples and Comparative Examples was calculated from the following expression.

$$A = X \times Y$$

TABLE 1

| | Irradiation Dose [mJ/$cm^2$] | BR Temperature [° C.] | Film Surface Temperature [° C.] | Oxygen Concentration [%] | Content of Components having Molecular Weight of 400 or Lower [%] | Thickness [μm] | Evaluation of Bubbles | Oxygen Permeability co-efficient [$cm^3$ · mm/ ($m^2$ · day · atm)] |
|---|---|---|---|---|---|---|---|---|
| Example 1-1 | 300 | 15 | 25 | 20.6 | 0.8 | 99 | B | 5.6 |
| Example 1-2 | 500 | 20 | 40 | 20.6 | 0.6 | 100 | B | 5.6 |
| Example 1-3 | 800 | 35 | 60 | 20.6 | 0.3 | 95 | A | 5.6 |
| Example 1-4 | 1200 | 45 | 80 | 20.6 | <0.1 | 90 | A | 5.6 |
| Example 1-5 | 500 | 20 | 40 | <1 | <0.1 | 101 | B | 5.6 |
| Comparative Example 1-1 | 200 | 10 | 15 | 20.6 | 1.5 | 101 | D | 5.6 |
| Comparative Example 1-2 | 500 | 20 | 40 | <1 | <0.1 | 100 | A | 228 |

TABLE 1-continued

|  | Irradiation Dose [mJ/cm$^2$] | BR Temperature [° C.] | Film Surface Temperature [° C.] | Oxygen Concentration [%] | Content of Components having Molecular Weight of 400 or Lower [%] | Thickness [μm] | Evaluation of Bubbles | Oxygen Permeability co-efficient [cm$^3$·mm/ (m$^2$·day·atm)] |
|---|---|---|---|---|---|---|---|---|
| Example 2-1 | 500 | 20 | 40 | 20.6 | 0.6 | 100 | A | 5.6 |
| Example 2-2 | 900 | 35 | 70 | 20.6 | 0.2 | 102 | B | 5.6 |
| Example 2-3 | 1500 | 50 | 90 | 20.6 | <0.1 | 102 | C | 5.6 |
| Comparative Example 2-1 | 200 | 10 | 15 | 20.6 | 1.7 | 101 | D | 5.6 |
| Comparative Example 2-2 | 1800 | 60 | 105 | 20.6 | <0.1 | 45 | D | 5.6 |

The following can be seen from Table 1. In Examples 1-1 to 1-5 and 2-1 to 2-3, the content of the components having a molecular weight of 400 or lower in the wavelength conversion layer immediately after the curing was set to be 1% or lower by setting the film surface temperature during the curing. Therefore, the wavelength conversion members in which the formation of bubbles was suppressed and the oxygen barrier properties were high were able to be obtained. In Comparative Examples 1-1 and 2-1, in a case where the film surface temperature during curing was lower than the predetermined range, the content of components having a molecular weight of 400 or lower in the wavelength conversion layer immediately after the curing was 1% or higher, and bubbles were formed. In addition, in Comparative Example 2-2, in a case where the film surface temperature during curing was higher than the predetermined temperature, the polymerizable compound was volatilized, the thickness of the coating film was reduced, and bubbles were formed.

In Comparative Example 1-2, the polymerizable composition included only a compound having a molecular weight of higher than 200 as a polymerizable compound. At this time, substantially no components having a molecular weight of 400 or lower were present, the formation of bubbles was not suppressed, and substantially no bubbles were formed in the wavelength conversion layer. However, it is obvious that the oxygen permeability co-efficient was extremely higher and oxygen barrier properties were lower as compared to other examples where only a compound having a molecular weight of 200 or lower was included as a polymerizable compound.

What is claimed is:

1. A wavelength conversion member comprising:
a first substrate;
a second substrate; and
a wavelength conversion layer disposed between the first substrate and the second substrate and including quantum dots which are excited by excitation light to emit fluorescence,
wherein the wavelength conversion layer is a cured layer obtained by curing a polymerizable composition which includes the quantum dots and a polymerizable compound having a molecular weight of 200 or lower, and
the number of bubble-shaped defects having a diameter of 0.1 mm or more in the wavelength conversion layer is less than 10 per 100 cm$^2$.

2. The wavelength conversion member according to claim 1,
wherein the polymerizable compound is a radically polymerizable compound.

3. The wavelength conversion member according to claim 1,
wherein the polymerizable compound includes at least one monofunctional compound.

4. The wavelength conversion member according to claim 3,
wherein a content of the monofunctional compound in the polymerizable compound is 50 mass % or higher with respect to the total weight of the polymerizable compound.

5. The wavelength conversion member according to claim 1,
wherein an oxygen permeability co-efficient of the wavelength conversion layer is 100 [cm$^3$·mm/(m$^2$·day·atm)] or lower.

6. The wavelength conversion member according to claim 1,
wherein both the first substrate and the second substrate are barrier films having an oxygen permeability of 5.00 [cm$^3$/(m$^2$·day·atm)] or lower.

7. The wavelength conversion member according to claim 1,
wherein the quantum dots are at least one kind of quantum dots selected from the group consisting of quantum dots having a center emission wavelength in a wavelength range of 600 nm to 680 nm and having a full width at half maximum of emission peak of 70 nm or less, quantum dots having a center emission wavelength in a wavelength range of 520 nm to 560 nm and having a full width at half maximum of emission peak of 60 nm or less, and quantum dots having a center emission wavelength in a wavelength range of 430 nm to 480 nm and having a full width at half maximum of emission peak of 50 nm or less.

8. A backlight unit comprising:
the wavelength conversion member according to claim 1; and
a light source that emits the excitation light and includes a blue light emitting diode or an ultraviolet light emitting diode.

9. A liquid crystal display device comprising at least the backlight unit according to claim 8 and a liquid crystal cell.

10. A method of manufacturing a wavelength conversion member,
the wavelength conversion member including a first substrate, a second substrate, and a wavelength conversion layer disposed between the first substrate and the second substrate and including quantum dots which are excited by excitation light to emit fluorescence, and
the method comprising:
preparing a polymerizable composition which includes the quantum dots and a polymerizable compound having a boiling point of 190° C. or lower and a molecular weight of 200 or lower;

forming a coating film by applying the polymerizable composition including the quantum dots to a single surface of the first substrate;

forming the wavelength conversion layer by irradiating the coating film with active energy rays to cure the coating film while maintaining a film surface temperature T of the coating film in a temperature range defined by 25° C.<T<(the boiling point of the polymerizable composition−5)° C.; and laminating the second substrate on the wavelength conversion layer.

11. The method according to claim 10,
wherein in the step of curing the coating film, a non-coating film surface of the first substrate is supported in contact with a backup roll, and the film surface temperature of the coating film is adjusted by adjusting a temperature of the backup roll and an irradiation dose of the active energy rays.

12. The method according to claim 10,
wherein the step of curing the coating film is performed in an inert gas having an oxygen concentration of 1% or lower.

13. The method according to claim 10,
wherein the coating film is cured by using ultraviolet light as the active energy rays while controlling a rising slope of illuminance, which is defined by a peak illuminance during irradiation of the ultraviolet light/(an irradiation time×½), to be 500 mW/(cm$^2$·s) or lower.

14. The method according to claim 10,
wherein a plurality of irradiation light sources that emit the active energy rays to irradiate the coating film with the active energy rays are provided, a reaction rate of the polymerizable compound included in the coating film, which is obtained by irradiation of the active energy rays emitted from a first irradiation light source, is set to be 10% to 80% with respect to a final reaction rate of the polymerizable compound, and then the coating film is irradiated with the active energy rays emitted from second and other irradiation light sources.

15. A method of manufacturing a wavelength conversion member,
the wavelength conversion member including a first substrate, a second substrate, and a wavelength conversion layer disposed between the first substrate and the second substrate and including quantum dots which are excited by excitation light to emit fluorescence, and the method comprising:

preparing a polymerizable composition which includes at least the quantum dots and a polymerizable compound having a boiling point of 190° C. or lower and a molecular weight of 200 or lower;

forming a coating film by applying the polymerizable composition including the quantum dots to a single surface of the first substrate;

laminating the second substrate on the coating film such that the coating film is interposed between the first substrate and the second substrate; and forming the wavelength conversion layer by irradiating the coating film with active energy rays to cure the coating film while maintaining a film surface temperature T of the coating film in a temperature range defined by 25° C.<T<(the boiling point of the polymerizable composition+15)° C.

16. The method according to claim 15,
wherein in the step of curing the coating film, a non-coating film surface of the first substrate is supported in contact with a backup roll, and the film surface temperature of the coating film is adjusted by adjusting a temperature of the backup roll and an irradiation dose of the active energy rays.

17. The method according to claim 15,
wherein the step of curing the coating film is performed in an inert gas having an oxygen concentration of 1% or lower.

18. The method according to claim 15,
wherein the coating film is cured by using ultraviolet light as the active energy rays while controlling a rising slope of illuminance, which is defined by a peak illuminance during irradiation of the ultraviolet light/(an irradiation time×½), to be 500 mW/(cm$^2$·s) or lower.

19. The method according to claim 15,
wherein a plurality of irradiation light sources that emit the active energy rays to irradiate the coating film with the active energy rays are provided, a reaction rate of the polymerizable compound included in the coating film, which is obtained by irradiation of the active energy rays emitted from a first irradiation light source, is set to be 10% to 80% with respect to a final reaction rate of the polymerizable compound, and then the coating film is irradiated with the active energy rays emitted from second and other irradiation light sources.

* * * * *